(12) United States Patent
Kuga et al.

(10) Patent No.: US 8,471,729 B2
(45) Date of Patent: Jun. 25, 2013

(54) ROAD-VEHICLE COMMUNICATION SYSTEM

(75) Inventors: Kouji Kuga, Sagamihara (JP); Hideyuki Nagatomo, Kawasaki (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 357 days.

(21) Appl. No.: 12/918,081

(22) PCT Filed: Feb. 20, 2009

(86) PCT No.: PCT/JP2009/052958
§ 371 (c)(1), (2), (4) Date: Aug. 18, 2010

(87) PCT Pub. No.: WO2009/104711
PCT Pub. Date: Aug. 27, 2009

(65) Prior Publication Data
US 2010/0321206 A1    Dec. 23, 2010

(30) Foreign Application Priority Data

Feb. 21, 2008  (JP) ................................ 2008-040052

(51) Int. Cl.
*G08G 1/09*    (2006.01)
(52) U.S. Cl.
USPC ........... 340/905; 340/928; 340/933; 340/937; 340/5.8; 701/400; 701/414; 701/415; 701/419; 701/420; 701/431
(58) Field of Classification Search
USPC ........... 340/905, 928, 933, 937, 5.8; 701/400, 701/414, 415, 419, 420, 431
See application file for complete search history.

(56) References Cited

U.S. PATENT DOCUMENTS 5,554,984 A * 9/1996 Shigenaga et al. ............ 340/937
5,710,702 A * 1/1998 Hayashi et al. ................... 701/1
(Continued)

FOREIGN PATENT DOCUMENTS

EP  0 692 775 A1  1/1996
EP  1 022 656 A2  7/2000
(Continued)

OTHER PUBLICATIONS

Notification of Transmittal of Translation of the International Preliminary Report on Patentability (Application No. PCT/JP2009/052958) dated Oct. 14, 2010.

(Continued)

*Primary Examiner* — Tai T Nguyen
(74) *Attorney, Agent, or Firm* — Eric J. Robinson; Robinson Intellectual Property Law Office, P.C.

(57) ABSTRACT

A road-vehicle communication system enabling resumption of the transmission/reception from the rest of data between the vehicle and the road if the transmission/reception is interrupted. Specifically, the road-vehicle communication system includes a roadside apparatus for distributing a content and a vehicle-mounted device which can play a distributed content, the roadside apparatus is connected communicatively with the vehicle-mounted device, and a series of contents are distributed from the roadside apparatus to the vehicle-mounted device. The roadside apparatus includes a control unit for determining a content which the roadside apparatus starts transmitting to the vehicle-mounted device, which is a communication party, from among the series of contents and distributing the other contents succeeding the determined transmission start content. Thus, if the transmission/reception of data between the road and vehicle is interrupted, the transmission/reception can be resumed.

10 Claims, 34 Drawing Sheets

U.S. PATENT DOCUMENTS

2003/0109233 A1* 6/2003 Shi et al. .................. 455/116
2008/0150707 A1* 6/2008 Shamoto ................ 340/425.5

FOREIGN PATENT DOCUMENTS

| JP | 2000-082196 | 3/2000 |
|----|-------------|--------|
| JP | 2000-207219 | 7/2000 |
| JP | 2001-345829 | 12/2001 |
| JP | 2003-151078 | 5/2003 |
| JP | 2006-157895 | 6/2006 |
| JP | 2006-163512 | 6/2006 |

OTHER PUBLICATIONS

Supplementary European Search Report (Application No. 09712982.9) dated Jun. 21, 2012.
International Search Report for Application Serial No. PCT/JP2009/052958 dated May 19, 2009.

* cited by examiner

FIG. 6

| ID | | CLASSIFICATION |
|---|---|---|
| 00 | | CONFIGURATION ID INFORMATION |
| 01 | PROVIDER | SERVICE PROVIDER CODE |
| | | SERVICE PROVIDER DISPLAY TEXT |
| | | SERVICE PROVIDER PHONOGRAM CHARACTER STRING |
| 02 | CONTENTS | INFORMATION PROVIDING COMPANY CODE |
| | | INFORMATION PROVIDING COMPANY DISPLAY TEXT |
| | | INFORMATION PROVIDING COMPANY PHONOGRAM CHARACTER STRING |
| | | INFORMATION CODE |
| | | INFORMATION DISPLAY TEXT |
| | | INFORMATION PHONOGRAM CHARACTER STRING |
| | | TASTE DATA CATEGORY |
| 03 | | DIRECT REPRODUCTION/STORAGE CODE |
| | | REPRODUCTION REQUIREMENT CODE |
| 04 | EXPIRATION DATE | START DATE, HOUR, MINUTE, AND SECOND (START DATE AND TIME OF EXPIRATION DATE) |
| | | END DATE, HOUR, MINUTE, AND SECOND (END DATE AND TIME OF EXPIRATION DATE) |
| 05 | PROVISION TIME | BUSINESS TIME |
| | | INFORMATION PROVISION TIME |
| 10 | OBJECT POINT | OBJECT POINT COORDINATES |
| | | OBJECT POINT DISPLAY TEXT |
| | | ... |
| 20 | INFORMATION PROVISION POINT | INFORMATION PROVISION CENTRAL COORDINATES |
| | | ... |
| | | DISPLAY IMAGE DATA |
| | | PHONOGRAM CHARACTER STRING DATA |
| | | COMPRESSION VOICE DATA |
| | | ... |
| 30 | TRANSITION INFORMATION | NEXT REPRODUCTION INFORMATION CODE 1 |
| | | ... |
| | | NEXT REPRODUCTION INFORMATION CODE 8 |
| 40 | DETAIL INFORMATION | DETAIL INFORMATION 1 |
| | | DETAIL INFORMATION 1 DISPLAY TEXT |
| | | ... |
| ... | ... | ... |

FIG. 7

| TAG | TAG NAME | ITEM |
|---|---|---|
| 1 | BASIC INFORMATION | DESTINATION |
| | | STOPOVER 1 |
| | | ... |
| | | CUMULATIVE TRAVELING DISTANCE |
| | | TASTE GENRE TABLE VERSION |
| | | TASTE GENRE DATA |
| | | MEMBER INFORMATION 1 |
| | | ... |
| | | MEMBER INFORMATION 8 |
| 2 | PAST DROP-IN PLACE 1 | PAST DROP-IN PLACE 1 |
| | | ... |
| | | PAST DROP-IN PLACE 41 |
| 3 | PAST DROP-IN PLACE 2 | PAST DROP-IN PLACE 42 |
| | | ... |
| | | PAST DROP-IN PLACE 82 |
| 4 | ADVERTISEMENT RECEPTION/ REPRODUCTION LOG 1 | RECEPTION/REPRODUCTION HISTORY 1 |
| | | ... |
| | | RECEPTION/REPRODUCTION HISTORY 123 |
| 5 | ADVERTISEMENT RECEPTION/ REPRODUCTION LOG 2 | RECEPTION/REPRODUCTION HISTORY 124 |
| | | ... |
| | | RECEPTION/REPRODUCTION HISTORY 246 |

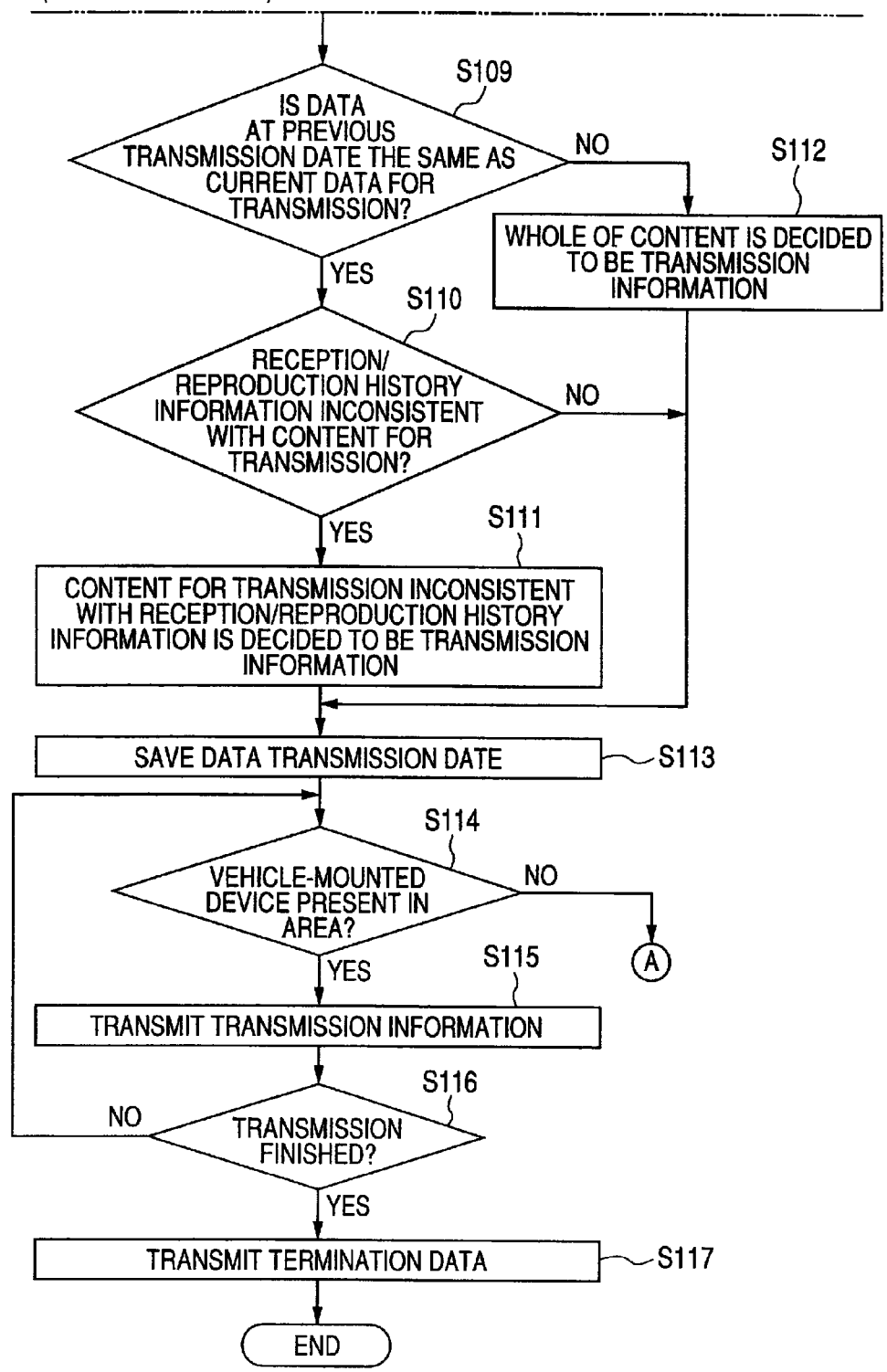

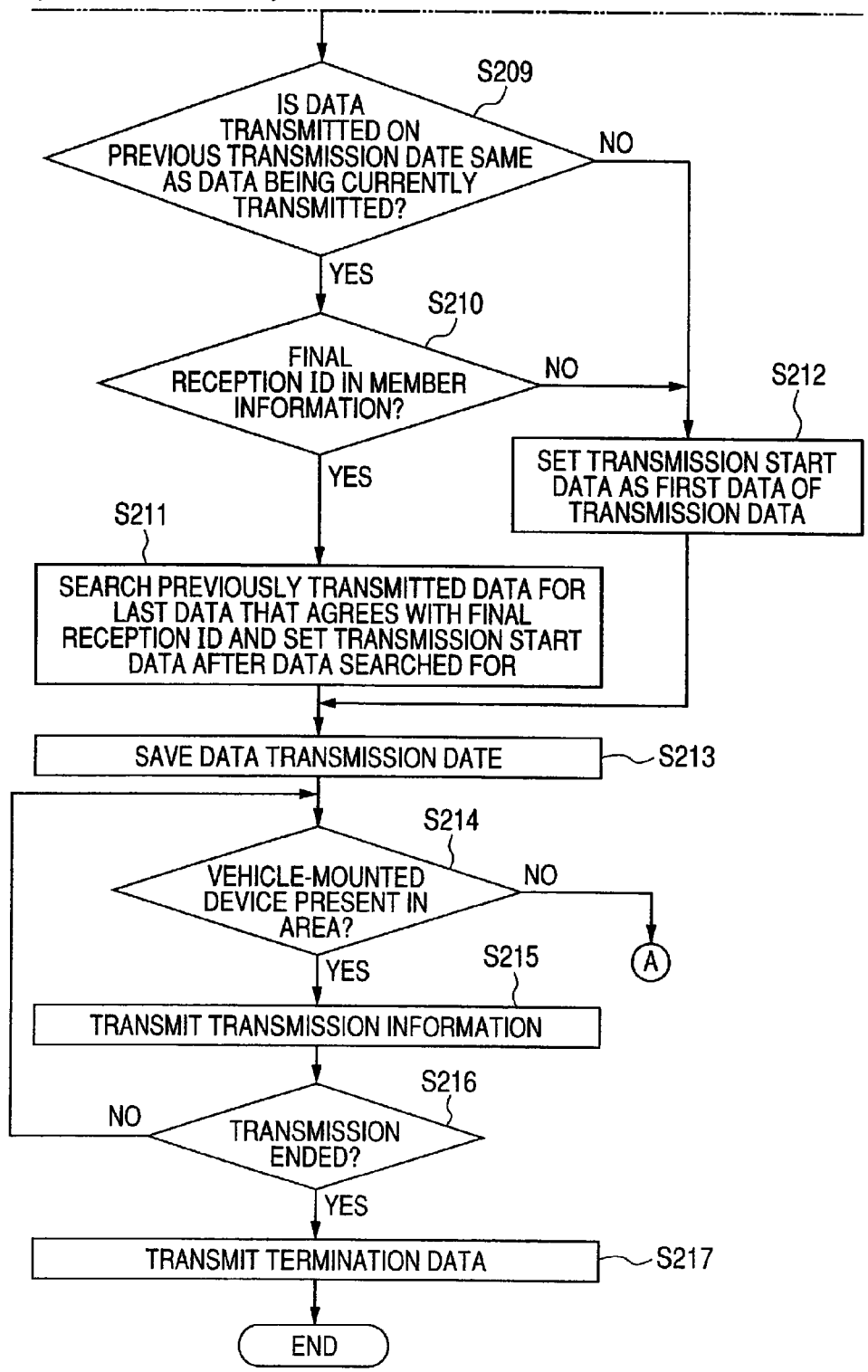

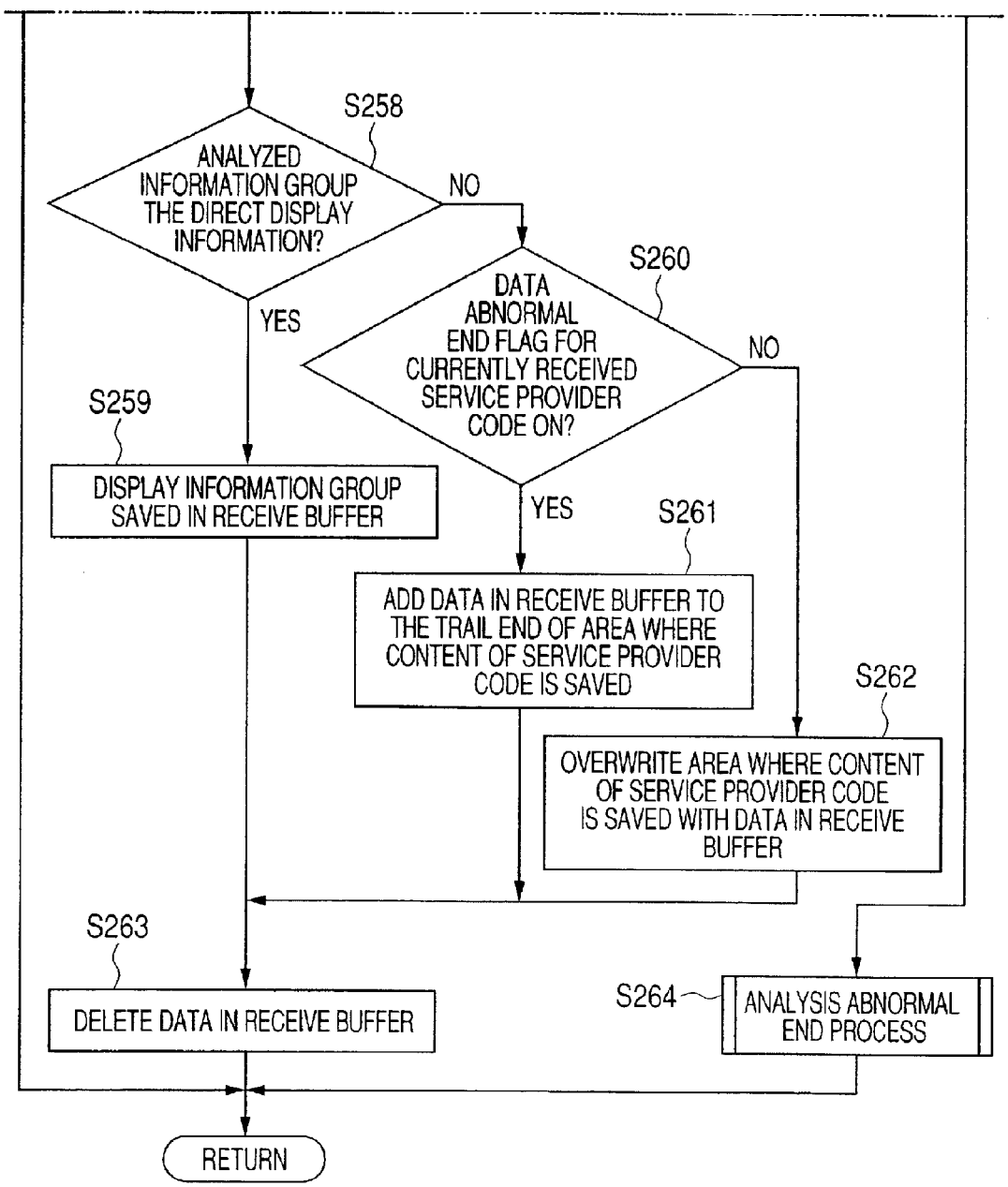

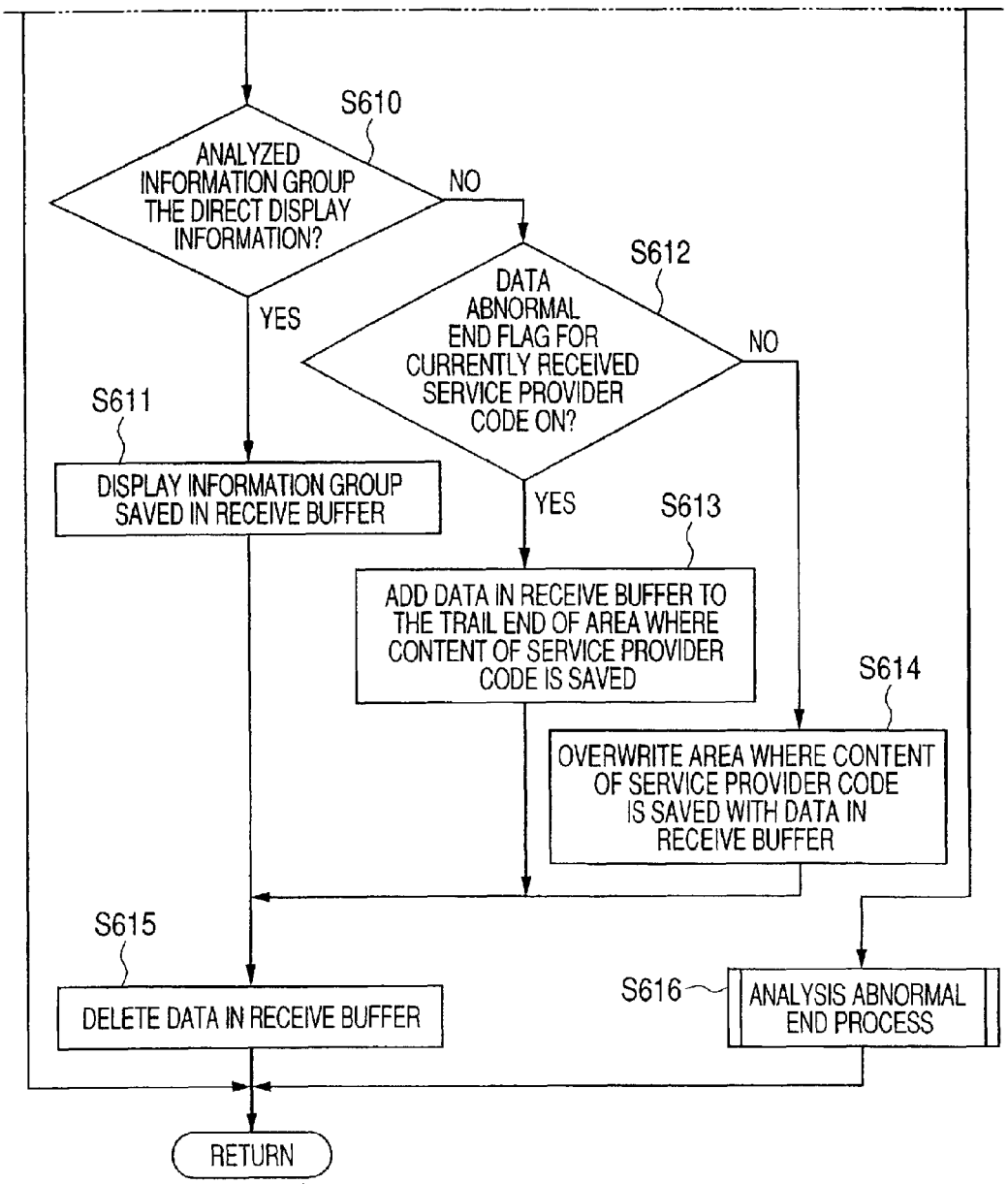

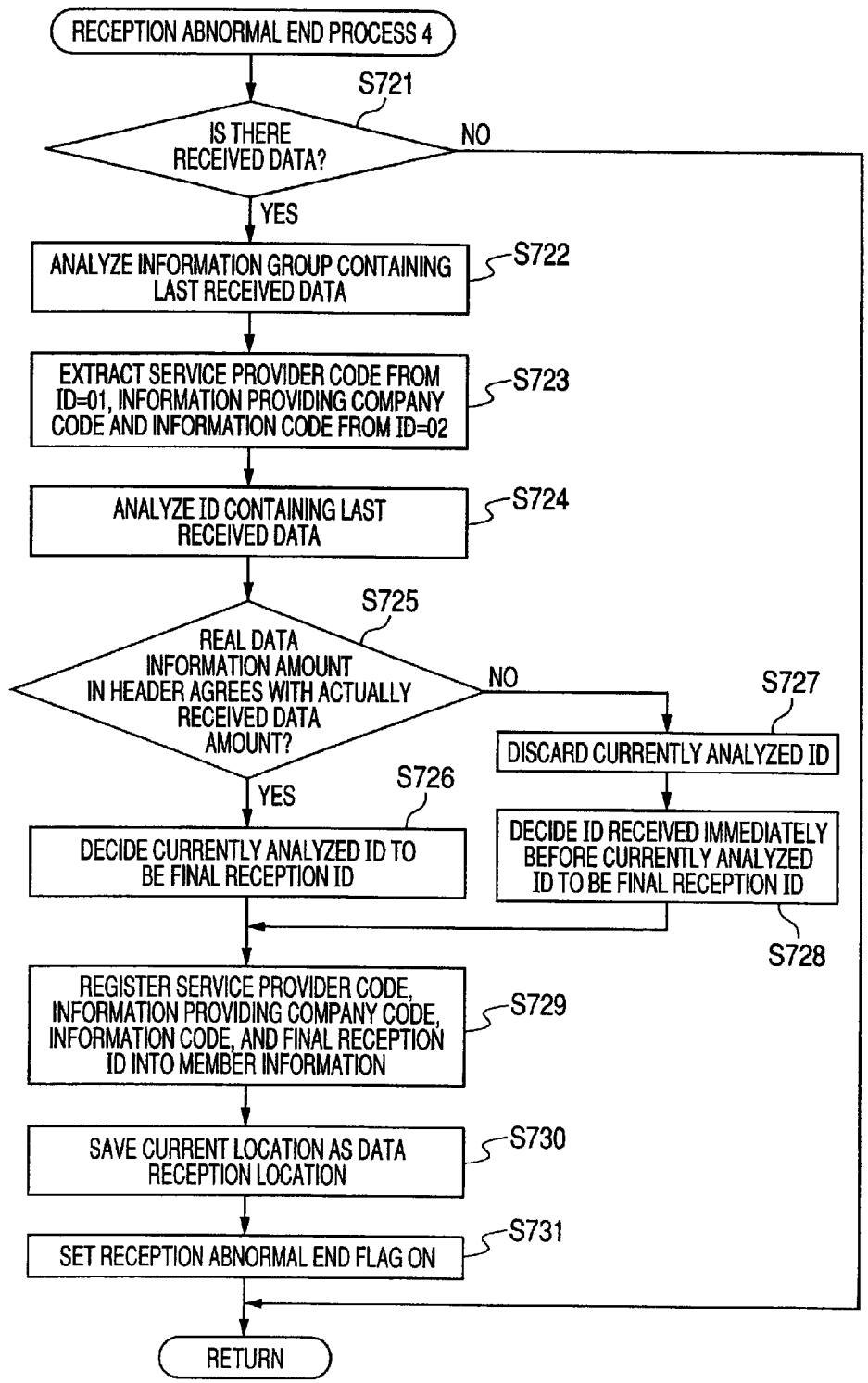

ROAD-VEHICLE COMMUNICATION SYSTEM

TECHNICAL FIELD

The present invention relates to a road-vehicle communication system for two-way radio communication between a roadside apparatus and a vehicle-mounted device.

BACKGROUND ART

A road-vehicle communication system including a roadside apparatus and a vehicle-mounted device for two-way radio communication between the roadside apparatus and the vehicle-mounted device has been known. The road-vehicle communication system adopts a short range communication system called DSRC (Dedicated Short Range Communication) has been adopted.

It has been considered to distribute regional information (e.g., information on or advertisement for the neighboring shops and medical institutions) from the roadside apparatus to the vehicle-mounted device via the DSRC. The regional information transmitted from the roadside apparatus is saved in the vehicle-mounted device so that it can be reproduced by the vehicle-mounted device even when the vehicle-mounted device cannot communicate with the roadside apparatus (for example, Patent Document 1.)

Patent Document 1: Japanese Patent Application Laid-Open No. 2007-109032

DISCLOSURE OF THE INVENTION

Problems to be Solved by the Invention

The above-mentioned conventional art is capable of determining the piece of data the roadside apparatus transmitted to the destined vehicle-mounted device at the previous transmission upon the two-way communication is being established between the roadside apparatus and the vehicle-mounted device; however, it is not capable of determining the information saved by the vehicle-mounted device. Therefore, if the communication between the roadside apparatus and the vehicle-mounted device is interrupted, the roadside apparatus needs to transmit the data from the beginning. The roadside apparatus may transmit a large amount of data, but if that time-spending transmission of data is interrupted, even thought at the very last piece, the whole data needs to be transmitted and received by spending the long time period.

An object of the present invention is to provide a road-vehicle communication system that is capable of resuming the transmission/reception from the rest of the data if the transmission/reception of the data is interrupted.

Means for Solving the Problems

According to the first aspect of the present invention, the present invention is adapted to achieve the above-mentioned object, a road-vehicle communication system of the present invention is the road-vehicle communication system including a roadside apparatus for transmitting a content and a vehicle-mounted device for reproducing the content transmitted from the roadside apparatus wherein the roadside apparatus is connected communicatively with the vehicle-mounted device, and a series of contents are transmitted from the roadside apparatus to the vehicle-mounted device, characterized in that the roadside apparatus includes: a control unit for deciding a content which the roadside apparatus starts transmitting to the vehicle-mounted device, which is a communication party, from among the series of contents and transmitting the other contents succeeding the decided transmission start content; and a transmission history storage unit for storing transmission history information, which indicates the content transmitted last among the series of contents for each vehicle-mounted device, wherein the control unit identifies the vehicle-mounted device to be a communication party based on vehicle-mounted device information transmitted from the vehicle-mounted device upon starting the communication, and decides the contents succeeding the content transmitted last to be the transmission start content.

According to the second aspect of the present invention, a road-vehicle communication system of the present invention is the road-vehicle communication system including a roadside apparatus for transmitting a content and a vehicle-mounted device for reproducing the content transmitted from the roadside apparatus wherein the roadside apparatus is connected communicatively with the vehicle-mounted device, and a series of contents are transmitted from the roadside apparatus to the vehicle-mounted device, characterized in that the roadside apparatus includes: a control unit for deciding a content which the roadside apparatus starts transmitting to the vehicle-mounted device, which is a communication party, from among the series of contents and transmitting the other contents succeeding the decided transmission start content; and the vehicle-mounted device includes: a reception history storage unit for storing reception history information, which indicates the content received last among the series of contents transmitted from the roadside apparatus; and a control unit for transmitting the reception history information to the roadside apparatus upon starting the communication, wherein the control unit of the roadside apparatus decides the content succeeding the content received last to be the transmission start content based on the reception history information transmitted from the vehicle-mounted device.

According to the third aspect of the present invention, a road-vehicle communication system of the present invention is the road-vehicle communication system including a roadside apparatus for transmitting a content and a vehicle-mounted device for reproducing the content transmitted from the roadside apparatus wherein the roadside apparatus is connected communicatively with the vehicle-mounted device, and a series of contents are transmitted from the roadside apparatus to the vehicle-mounted device, characterized in that the roadside apparatus includes: a control unit for deciding a content which the roadside apparatus starts transmitting to the vehicle-mounted device, which is a communication party, from among the series of contents and transmitting the other contents succeeding the decided transmission start content; and a transmission history storage unit for storing transmission history information, which indicates the content transmitted last among the series of contents for each vehicle-mounted device, and the vehicle-mounted device includes: a reception history storage unit for storing reception history information, which indicates the content received last among the series of contents transmitted from the roadside apparatus; and a control unit for transmitting the reception history information to the roadside apparatus upon starting the communication, and wherein the control unit of the roadside apparatus decides the content succeeding the content received last to be the transmission start content based on the reception history information, if the reception history information transmitted from the vehicle-mounted device does not agree with the transmission history information for the vehicle-mounted device.

The road-vehicle communication system of the present invention characterized in that the content includes a plurality of elements classified according to their details; the reception history information includes the last received element information; and the control unit of the roadside apparatus decides the last received content to be the transmission start content based on the reception history information transmitted from the vehicle-mounted device, and transmits the content from the element succeeding the element identified by the element information.

The road-vehicle communication system of the present invention characterized in that the transmission history storage unit stores the date of transmission together with the transmission history information, and the control unit of the roadside apparatus decides the first content of the series of contents to be the transmission start content, if the series of contents to be transmitted differ from the series of contents transmitted on the date of transmission.

The road-vehicle communication system of the present invention characterized in that the vehicle-mounted device includes a current location storing means for storing the current location, and the control unit of the roadside apparatus decides the first content of the series of contents to be the transmission start content, if a first current location stored in the current location storing means when the communication was interrupted is not within a predetermined range from a second current location that has just been stored in the current location storing means.

According to the fourth aspect of the present invention, a computer readable program for implementing a method for enabling resumption of transmission/reception from the rest in a road-vehicle communication system including a roadside apparatus for transmitting a content and a vehicle-mounted device for reproducing the content transmitted from the roadside apparatus, wherein the roadside apparatus is connected communicatively with the vehicle-mounted device, if the content is stored in a storage medium of the roadside apparatus and the transmission/reception of the content between the roadside apparatus and the vehicle-mounted device is interrupted, characterized in that the program is executed on a processor of the roadside apparatus to cause the processor to perform a step of deciding a content which the roadside apparatus starts transmitting to the vehicle-mounted device, which is a communication party, from among a series of contents and transmitting the other contents succeeding the decided transmission start content; and a step of storing transmission history information, which indicates the content transmitted last among the series of contents for each vehicle-mounted device, wherein a control unit of the roadside apparatus identifies the vehicle-mounted device to be a communication party based on vehicle-mounted device information transmitted from the vehicle-mounted device upon starting the communication, and decides the content succeeding the content transmitted last to be the transmission start content based on the transmission history information for the identified vehicle-mounted device.

According to the fifth aspect of the present invention, the present invention is a method for enabling resumption of transmission/reception from the rest in a road-vehicle communication system including a roadside apparatus for transmitting a content and a vehicle-mounted device for reproducing the content transmitted from the roadside apparatus, wherein the roadside apparatus is connected communicatively with the vehicle-mounted device, and a series of contents are transmitted from the roadside apparatus to the vehicle-mounted device, if the transmission/reception of the content between the roadside apparatus and the vehicle-mounted device is interrupted, characterized by including a step of deciding a content which the roadside apparatus starts transmitting to the vehicle-mounted device, which is a communication party, from among the series of contents and transmitting the other contents succeeding the decided transmission start content; and a step of storing transmission history information, which indicates the content transmitted last among the series of contents for each vehicle-mounted device, wherein a control unit of the roadside apparatus identifies the vehicle-mounted device to be a communication party based on vehicle-mounted device information transmitted from the vehicle-mounted device upon starting the communication, and decides the content succeeding the content transmitted last to be the transmission start content based on the transmission history information for the identified vehicle-mounted device.

According to the sixth aspect of the present invention, the present invention is a method for enabling resumption of transmission/reception from the rest in a road-vehicle communication system including a roadside apparatus for transmitting a content and a vehicle-mounted device for reproducing the content transmitted from the roadside apparatus, wherein the roadside apparatus is connected communicatively with the vehicle-mounted device, and a series of contents are transmitted from the roadside apparatus to the vehicle-mounted device, if the transmission/reception of the content between the roadside apparatus and the vehicle-mounted device is interrupted, characterized by including: a step of deciding a content which the roadside apparatus starts transmitting to the vehicle-mounted device, which is a communication party, from among the series of contents and transmitting the other contents succeeding the decided transmission start content at a control unit of the roadside apparatus; and a step of storing reception history information, which indicates the content received last among the series of contents transmitted from the roadside apparatus, into a reception history storage unit of the vehicle-mounted device, wherein a control unit of the vehicle-mounted device transmits the reception history information to the roadside apparatus upon starting the communication, and the control unit of the roadside apparatus decides the content succeeding the content received last to be the transmission start content based on the reception history information transmitted from the vehicle-mounted device.

According to the seventh aspect of the present invention, the present invention is a method for enabling resumption of transmission/reception from the rest in a road-vehicle communication system including a roadside apparatus for transmitting a content and a vehicle-mounted device for reproducing the content transmitted from the roadside apparatus, wherein the roadside apparatus is connected communicatively with the vehicle-mounted device, and a series of contents are transmitted from the roadside apparatus to the vehicle-mounted device, if the transmission/reception of the content between the roadside apparatus and the vehicle-mounted device is interrupted, characterized by including: a step of deciding a content which the roadside apparatus starts transmitting to the vehicle-mounted device, which is a communication party, from among the series of contents and transmitting the other contents succeeding the decided transmission start content at a control unit of the roadside apparatus; a step of storing transmission history information, which indicates the content transmitted last among the series of contents for each vehicle-mounted device, into a transmission history storage unit of the roadside apparatus, and a step of storing reception history information, which indicates the content received last among the series of contents transmitted from the roadside apparatus, into a reception history storage unit of the vehicle-mounted device, wherein a control unit of the vehicle-mounted device transmits the reception history information to the roadside apparatus upon starting the communication, and the control unit of the roadside apparatus decides the content succeeding the content received last to be the transmission start content based on the reception history information, if the reception history information transmitted from the vehicle-mounted device does not agree with the transmission history information for the vehicle-mounted device.

Effect of the Invention

The present invention can provide a road-vehicle communication system for enabling resumption of from the rest of data if the transmission/reception of data between the roadside apparatus and the vehicle-mounted device is interrupted.

BRIEF DESCRIPTION OF THE DRAWINGS

FIG. 6 is a schematic diagram showing an example of details of each element that forms an information group;

FIG. 7 is a schematic diagram showing an example of details of uplink data transmitted from the vehicle-mounted device 5 to the roadside apparatus 2;

FIG. 30 is a flow chart showing an example of a reception abnormal end process 4.

Figure 1:
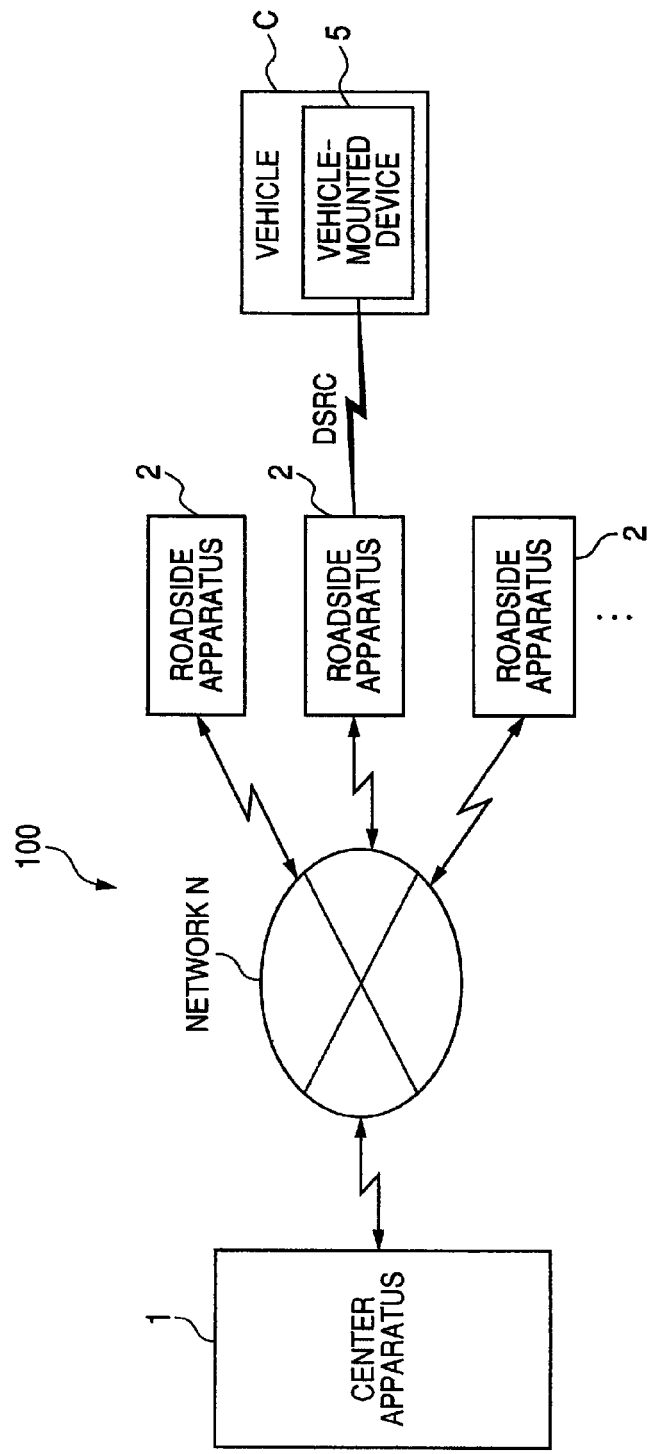
FIG. 1 is a schematic diagram showing a system configuration of a road-vehicle communication system 100 according to an embodiment.

DESCRIPTION OF REFERENCES 1 center apparatus
11 control unit
12 network communication unit
13 contents storage unit
2 roadside apparatus
21 control unit
22 DSRC communication unit
23 network communication unit
24 storage unit
5 vehicle-mounted device
51 control section
52 DSRC section
521 DSRC control unit
522 DSRC communication unit
523 storage unit
524 ETC processing unit
525 IC card interface
53 VICS module
54 car navigation section
541 car navigation unit
542 current location detection unit
543 map storage unit
544 operation unit
545 output unit
546 storage unit
547 network communication unit

BEST MODES FOR CARRYING OUT THE INVENTION

Embodiments of the present invention will be described below with reference to the drawings.

FIG. 1 is a schematic diagram showing a system configuration of a road-vehicle communication system 100 according to an embodiment.

As shown in the figure, the road-vehicle communication system 100 includes a center apparatus 1, a roadside apparatus 2, and a vehicle-mounted device 5, which is mounted on a vehicle C. Although only one center apparatus 1 is shown in FIG. 1, the center apparatus 1 is installed for each service providing provider that provides contents.

The roadside apparatus 2 is settled on the street, in a car park, and the like by a plural number, being connected with the center apparatus 1 via a network N. The roadside apparatus 2 performs transmission/reception of information with the vehicle-mounted device 5 via DSRC (Dedicated Short Range Communication).

That is, the center apparatus 1 is capable of providing the contents to the vehicle-mounted device 5 via the roadside apparatus 2. The vehicle-mounted device 5 performs a reproducing process on the provided content to output the voice based on the content from a loudspeaker or display an image on a display device.

Figure 2:
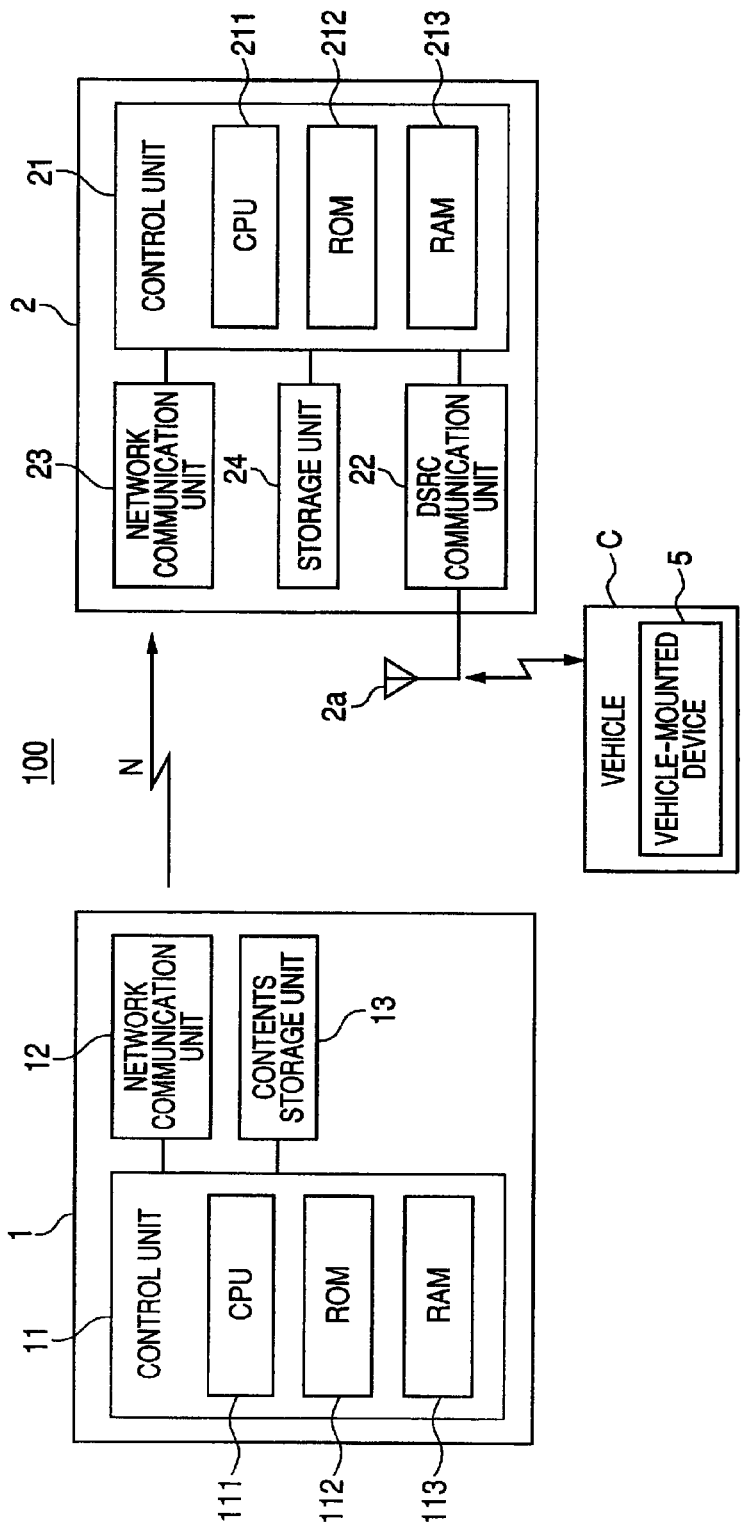
FIG. 2 is a block diagram showing an internal configuration of a center apparatus 1 and a roadside apparatus 2.

FIG. 2 is a block diagram showing an internal configuration of the center apparatus 1 and the roadside apparatus 2. That is, the center apparatus 1 and the roadside apparatus 2 include processing units (e.g., computer terminal) including functional blocks shown in FIG. 2, respectively.

As shown in the figure, the center apparatus 1 includes a control unit 11, a network communication unit 12, and a contents storage unit 13.

The control unit 11 includes a CPU 111, a ROM 112, and a RAM 113. The CPU 111 not only performs various operations but also controls the network communication unit 12 by using the RAM 113 as a workspace to execute a control program stored in the ROM 112.

The network communication unit 12 transmits the content to the roadside apparatus 2 over the network N.

The contents storage unit 13, which may be a hard disk, for example, stores the contents to be provided to the vehicle-mounted device 5. The content contains text information, image information, music information, and the like to be provided for the user, on advertisements for shops, information on car parks and medical institutions, coupons, and the like. The content is arranged in a predetermined format (what is called a multimedia content format).

The roadside apparatus 2 includes a control unit 21, a DSRC communication unit 22, a network communication unit 23, and a storage unit 24.

The control unit 21 includes a CPU 211, a ROM 212, and a RAM 213. The CPU 211 not only performs various operations but also controls the DSRC communication unit 22 and the network communication unit 23 by using the RAM 213 as a workspace to execute a control program stored in the ROM 212.

The DSRC communication unit 22 transmits the content to the vehicle-mounted device 5 mounted on the vehicle C via the DSRC.

The network communication unit 23 receives content information and the like from the center apparatus 1 via the network N.

When the roadside apparatus 2 receives the content transmitted from the center apparatus 1, the DSRC communication unit 22 stores the received content and always sends out the DSRC waves for providing the contents. When the vehicle C passes through the range (roadside area) where the vehicle C can communicate with the roadside apparatus 2, the content is distributed to the vehicle-mounted device 5 that is mounted on the vehicle C.

The storage unit 24 is a random access semiconductor memory, for example. The storage unit stores the content transmitted from the above-mentioned center apparatus and also stores a data transmission history and a data transmission date and the like for each vehicle-mounted device 5.

Figure 3:
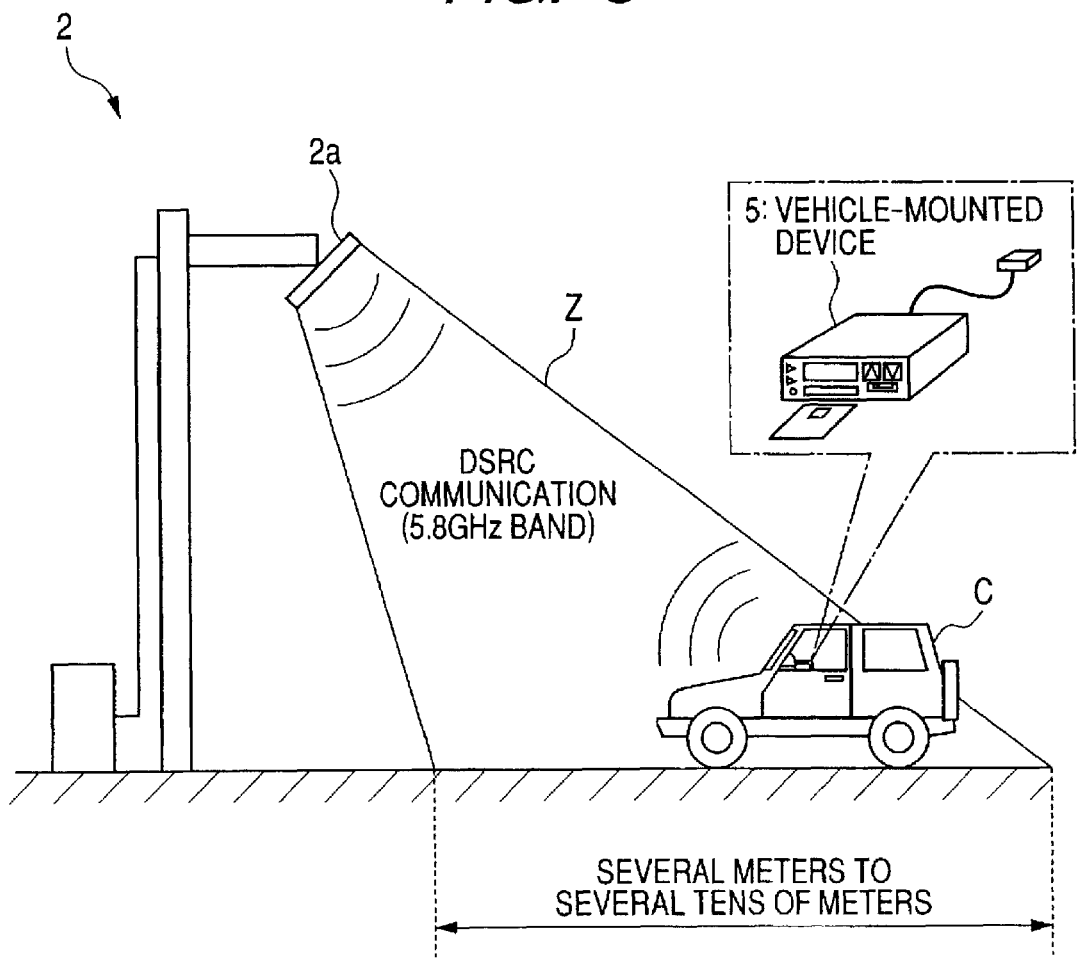
FIG. 3 is a schematic diagram showing a roadside area Z, which is a communication available range for a roadside apparatus 2.

FIG. 3 is a schematic diagram showing a roadside area Z, which is a communication available range for the roadside apparatus 2.

As shown in FIG. 3, the roadside apparatus 2 radiates the DSRC waves, the service area of which is limited, from an antenna 2a installed at the roadside or above the road to form a roadsides area Z near the roadside apparatus 2. Here, DSRC is the 5.8 GHz band Dedicated Short-Range Communication, ranging from several meters to tens of meters, for example.

As the plurality of roadside apparatuses 2 are set to output the same range of DSRC waves in the roadside apparatus 100, the roadside apparatuses 2 form almost consistent roadside areas regardless of the places they are installed. Each roadside apparatus 2 covers a two-way radio communication (road-vehicle communication) only with the vehicle-mounted device 5 mounted on the vehicle C in its roadside area.

Figure 4:
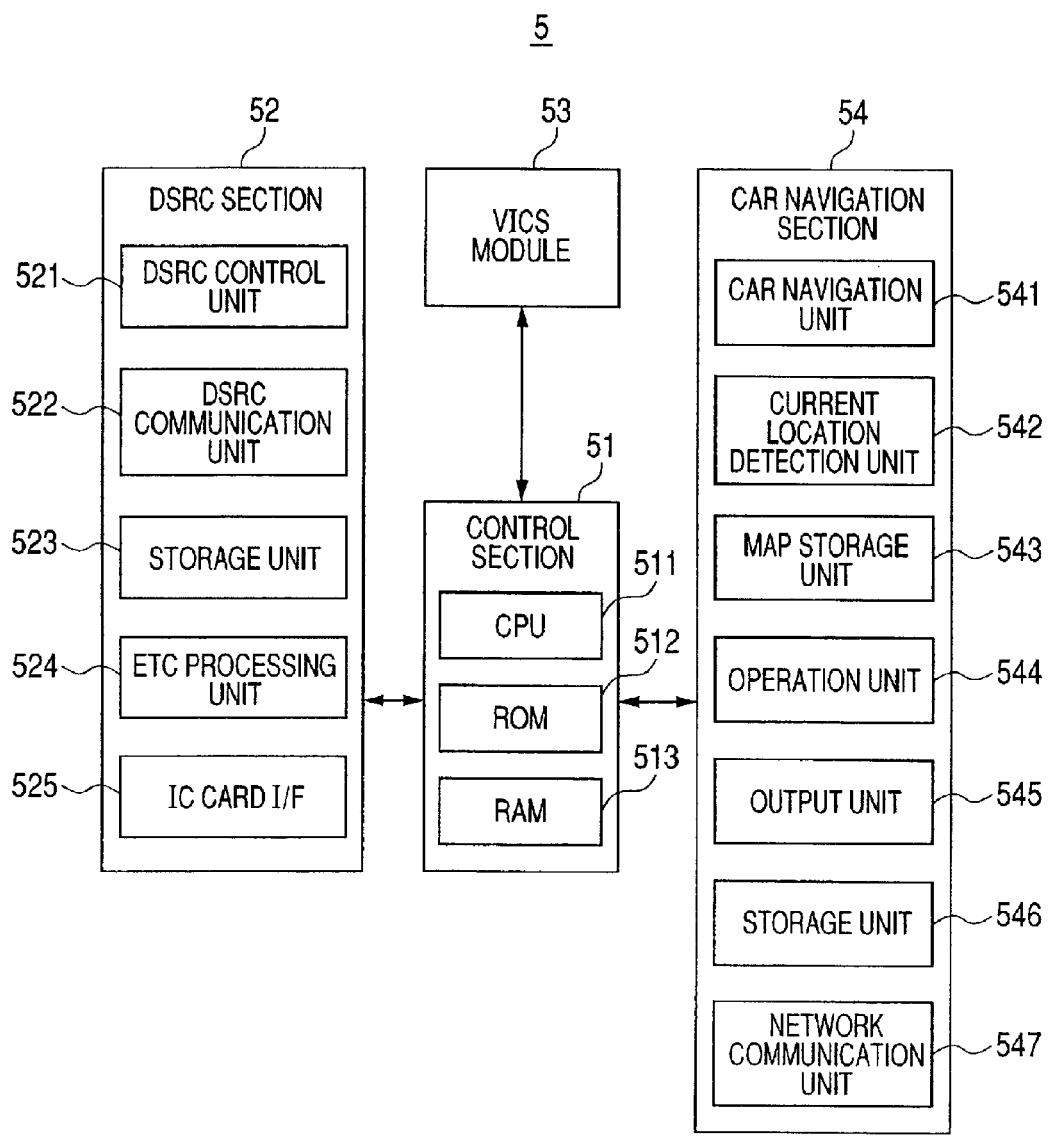
FIG. 4 is a block diagram showing an exemplary configuration of a vehicle-mounted device 5 that is mounted on a vehicle C.

FIG. 4 is a block diagram showing an exemplary configuration of the vehicle-mounted device 5 that is mounted on a vehicle C.

The vehicle-mounted device 5, which is an ITS (Intelligent Transport Systems) vehicle-mounted device that is applicable to ITS, receives the contents and the like distributed from the center apparatus 1 via the roadside apparatus 2, reproduces and outputs the contents in the roadside apparatus 100.

As shown in the figure, the vehicle-mounted device 5 includes a control section 51, a DSRC section 52, a VICS module 53, and a car navigation section 54.

The control section 51 includes a CPU 511, a ROM 512, and a RAM 513. The CPU 511 not only performs various operations but also centralized control on all the components by using the RAM 513 as a workspace to execute a control program stored in the ROM 512.

The DSRC section 52 includes a DSRC control unit 521, a DSRC communication unit 522, a storage unit 523, an ETC processing unit 524, and an IC card interface 525, and performs processing for communicating with the roadside apparatus 2 and the ETC base station via DSRC.

The DSRC control unit 521 includes a CPU, a ROM, and a RAM (all not shown), and controls over the operations of all the components of the DSRC section 52 in conjunction with a control program stored in the ROM.

For example, when the ETC payment is performed, the DSRC control unit 521 controls the communication operation of the DSRC communication unit 522 to receive the payment information from the ETC base station. It also controls the ETC processing unit 524 to write the payment information on an IC such as a credit card.

When the content distributed from the center apparatus 1 via the roadside apparatus 2 is received, the DSRC control unit 521 controls the DSRC communication unit 522 to transfer the content to the control section 51.

The DSRC communication unit 522 has an antenna set near the windshield on the dashboard in the vehicle C and communicates with the roadside apparatus 2 or the ETC base station via DSRC using the antenna.

The storage unit 523 may be a nonvolatile memory, for example, and stores the vehicle-mounted device ID (ASL-ID) allocated to the vehicle-mounted device 5, the vehicle information on the vehicle C to which the vehicle-mounted device 5 is mounted, and the like.

The ASL-ID is the vehicle-mounted device information allocated to each vehicle-mounted device in the manufacturing process. The vehicle information, including number plate information and model information (full-size car, medium sized car, small sized car, car for disabled driver, and the like) of the vehicle C to which the vehicle-mounted device 5 is mounted, is registered (set up) when the vehicle-mounted device 5 is mounted to the vehicle C.

The storage unit 523 includes a receive buffer that temporarily saves the content transmitted from the roadside apparatus 2 and a save buffer that analyses and saves the content that is temporarily saved in the receive buffer.

The ETC processing unit 524 reads and writes payment information and the like on the IC credit card, IC debit card, or the like that is inserted into the IC card interface 525.

The IC card interface 525 has a slot for a credit card or the like for mediating information exchange between the IC of the credit card or the like inserted into the slot and the ETC processing unit 524.

The VICS module 53 includes antennae for optical communication, FM communication, and 2.4 GHz radio wave communication, and performs an optical communication, an FM communication, and a radio wave communication with the VICS (Vehicle Information and Communication System.) The VICS module 53 receives traffic congestion information, traffic information, and the like from the VICS center and transfers it to the control section 51.

The car navigation section 54 includes a car navigation unit 541, a current location detection unit 542, a map storage unit 543, an operation unit 544, an output unit 545, a storage unit 546, and a network communication unit 547, and performs processing for guiding the vehicle C through the route, for example.

The car navigation unit 541 calculates the route from the current location of the vehicle C to the destination set via the operation unit 544 based on information on the current location acquired from the current location detection unit 542, map information stored in the map storage unit 543, and the like. Then, it creates a map for guiding the driver through the calculated route by using the map information stored in the map storage unit 543, and has the map displayed on the display device of the output unit 545. The car navigation unit 541 also functions as a reproduction unit for reproducing the content distributed from the center apparatus 1.

The current location detection unit 542 includes a GPS (Global Positioning System), gyroscope sensor, and the like.

The GPS receives a GPS signal transmitted from the GPS satellite and, based on the signal, calculates the vehicle location (latitude and longitude).

The gyro sensor detects (by an angular velocity sensor) the vehicle acceleration (rotational speed in the horizontal direction per unit time), which indicates the vector quantity, and also detects the true bearing of the vehicle by detecting the terrestrial magnetism (by a direction sensor).

The current location detection unit 542 creates the current location information (information including latitude, longitude, and the like) that indicates the current location of the vehicle, and information on the velocity of the vehicle, based on the information acquired from the GPS and gyro sensor.

The map storage unit 543, which may be a storage medium such as a hard disk, DVD, or the like, stores map information required for displaying a guide.

The operation unit 544 is formed by a hard key provided on the vehicle-mounted device, a touch panel (soft key) arranged on the display device of the output unit 545, or a remote controller. In response to an operation by a user, the operation unit 544 generates an operation signal corresponding to the operation and outputs the signal to the control section 51.

The output unit 545 is formed by a display device and a loudspeaker. When the content provided by the center apparatus 1 is reproduced, for example, a display guide is output on the display device and an audio guide is output from the loudspeaker based on the content.

The output unit 545 also functions as a notification unit for notifying the user of the content stored in the storage unit 546 by image or voice. The control section 51 in conjunction with the car navigation unit 541 controls the notification of the content by the output unit 545.

The display device of the output unit 545 has a touch panel function so that, in response to an operation on a button arranged on the screen, the control corresponding to the button is performed.

The storage unit 546 is a random access semiconductor memory, for example. The storage unit 546 stores the client information and the like that is basic information on the vehicle-mounted device 5 including guide information (traffic information, traffic congestion information, and the like), which is received via the VICS module 53, a travel history of the vehicle, the data receiving location, the kind of the content available for reproduction, the size of the screen, the available language, and the like.

The storage unit 546 also stores the content distributed from the center apparatus 1, and a list of contents arranged for the user reference.

The network communication unit 547 connects to the Internet via, for example, the roadside apparatus 2 available for IP connection or a mobile phone available for IP connection. For example, the network communication unit 547 connects to the site specified by the URL contained in the content. The connected site is to be displayed on the display device of the output unit 545 by a predetermined application software program like a web browser or the like.

Figure 5:
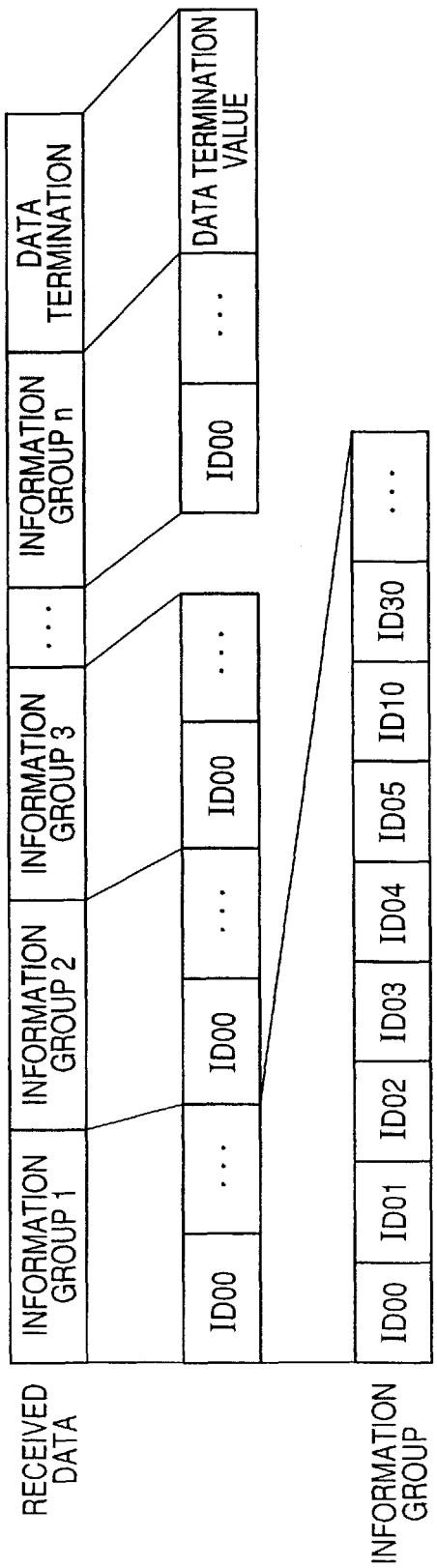
FIG. 5 is a schematic diagram for describing an example of a data structure of a content distributed from the center apparatus 1.

FIG. 5 is a schematic diagram for describing an example of a data structure of a content distributed from the center apparatus 1. As shown in FIG. 5, the center apparatus 1 distributes a plurality of information groups and data marks the termination of the entire data (hereafter, referred to as termination data) at a time, and the vehicle-mounted device 5 receives the plurality of information groups and the termination data, and reproduces or accumulates them in the storage unit 546.

Here, it is assumed that each of the information groups 1, 2, ..., n in FIG. 5 is a content and that the vehicle-mounted device 5 reproduces the information by the unit of information group. In this specification, the information group and the content will be treated as synonyms.

As shown in FIG. 5, an information group is formed by a plurality of elements which are classified for their details. Each element is formed by the ID number (00, 01, ... etc.) and real data stored in association with the ID number. FIG. 5 shows that the information group 1 includes the information defined by ID=00 (indicating that the ID number is "00", which applies to the following description), ID=01, ID=02, ID=03, ID=04, ID=05, ID=10, ID=30.

FIG. 6 is a schematic diagram showing an example of details of each element that forms an information group (real data stored in association with the ID number).

In ID=00, ID numbers of a plurality of elements forming the information group are described. For example, in the case of the information group 1 shown in FIG. 5, "00, 01, 02, 03, 04, 05, 10, 30, ..." are described in ID=00. The vehicle-mounted device 5 can confirm the elements forming the information group by referencing the information described in ID=00.

In ID=01, information on a service provider (center apparatus 1) that distributes a plurality of information groups including the information group is described. Specifically, the service provider code, which is defined by the institution managing the DSRC operation and uniquely allocated to each service provider, the service provider display text for visually notifying the user of the service provider, the service provider phonogram character string for notifying the user of the service provider by voice, and the like are described.

In ID=02, information on the information group (content) is described. Specifically, the information providing company code, which indicates the source of the information group distributed by the service provider, the information providing company display text for visually notifying the user of the information providing company, the information providing company phonogram character string for notifying the user of the information providing company by voice, the information code that is uniquely allocated to each information group by the service provider, the information display text for visually notifying the user of the name of the information group, the information phonogram character string for notifying the user of the information group by voice, the taste data category used in categorizing the information group, and the like are described.

In ID=03, information on the information group (content) is described. Specifically, the direct reproduction/storage code that indicates whether the received information group is to be reproduced as soon as it has been received or to be accumulated for enabling reference outside the communication area, and the reproduction requirement code for defining the action to be taken when the specified pop-up information cannot be reproduced in the area where the pop-up information should be reproduced (information provision point).

In ID=04, information on the expiration date for the information group (expiration date information) is described. Specifically, the start date and time of expiration date (start date, hour, minute, and second) and the end date and time of expiration date (end date, hour, minute, and second) are described. After the start date and time of expiration date, the reproduction of the information group is enabled, and after the end date and time of expiration date, the reproduction of the information group is disabled. That is, the expiration date information indicates the period for enabling the vehicle-mounted device 5 to reproduce the information group.

In ID=05, information on the provision time of the information group is described. Specifically, the business time for each day of the object point (shop or the like) defined in ID=10 to be described later, and the information provision time for each day for the pop-up information is displayed at the information provision point are described.

In ID=10, information on the object point that is the service object of the information group is described. Specifically, the object point coordinates representing the latitude and longitude of the service object point, the object point display text for visually notifying the user of the name of the object point, and the like are described.

In ID=20, information on the information provision point where the specified content (pop-up information) is to be reproduced is described. Specifically, the information provision central coordinates representing the central coordinates of the information provision area where the pop-up information is desired to be reproduced by latitude and longitude, the various kinds of data which will be displayed as the pop-up information to be reproduced at the information provision point (e.g., the display image data, the phonogram character string data, the compression voice data) and the like are described.

In ID=30, information on the information group to be made transition from the reproduced screen of the information group (transition information) is displayed. Specifically, the next reproduction information codes 1 to 8, which are the information codes (described in ID=02) of the information group to be made transitioned, are described. For example, when the next reproduction information codes 1 to 8 are described in ID=30, the vehicle-mounted device 5 arranges buttons (soft keys) with numbers 1 to 8 allocated for screen transition on the reproduced screen of the information group. In response to an operation on a button by the user, the vehicle-mounted device 5 makes transition to the information group specified by the next reproduction information code (the information code to be made transitioned) in association with the number of the operated button, and displays the reproduced screen based on the information group.

In ID=40, detail information for searching a plurality of information groups for the desired information group is displayed. Specifically, the detail information display text such as keywords and the like to make the user understood the service to be provided by the information group is described. For example, when the information group is the service information for providing the services useful for the user (e.g., coupon information, bargain information), that the information is coupon information or bargain information is described in ID=40.

In the elements of the information groups shown in FIG. 6, ID=00, 01, 02, 03, 04, 05, 10 are necessary elements, which are included in the information group as a rule.

When the vehicle-mounted device 5 according to the embodiment receives a plurality of information groups distributed from the center apparatus 1 via the roadside apparatus 2, the storage unit 546 of the car navigation section 54 stores and accumulates information arranged as shown in FIG. 6 for each information group. Here, the information groups to be stored in the storage unit 546 are the information groups with the storage codes set in ID=03.

FIG. 7 is a schematic diagram showing an example of details of uplink data transmitted from the vehicle-mounted device 5 to the roadside apparatus 2. As shown in FIG. 7, the uplink data is classified into five tags according to the content of the information.

For the tag 1, basic information is described. As the basic information, the destination, stopover, cumulative traveling distance, taste genre table version, taste genre data, and member information, for example, are described.

For the member information, the detail information (ID=40) received from the service provider is basically described. The member information covers the multipurpose information like distributing an advantage and the like granted for the member at the next visit individually to the member. As the member information is allowed to be freely assigned to each service provider, it can be used together with the detail information for various services.

For the tags 2 and 3, past drop-in places are described. Specifically, up to 82 sets of coordinates representing the place where the user stopped the vehicle are described. The coordinates representing the place where the user stopped the vehicle is basically the coordinates representing the place where the power supply of the vehicle-mounted device was disconnected. For the tag 2, the past drop-in places to 41 are described, and for the tag 3, the past drop-in places 42 to 82 are described.

For the tags 4 and 5, advertisement reception/reproduction logs are described. Specifically, up to 246 kinds of information codes of the contents the vehicle-mounted device has received and reception histories of the contents are described as reception/reproduction history. The vehicle-mounted device manages the reception/reproduction histories for each service provider. For the tag 4, the reception/reproduction histories 1 to 123 are described, and for the tag 5, the reception/reproduction histories 124 to 246 are described.

First Embodiment

The first embodiment will be described about the case where the roadside apparatus 2 decides and distributes a transmission content based on reception/reproduction history information contained in the uplink data transmitted from the vehicle-mounted device 5.

Figure 8:
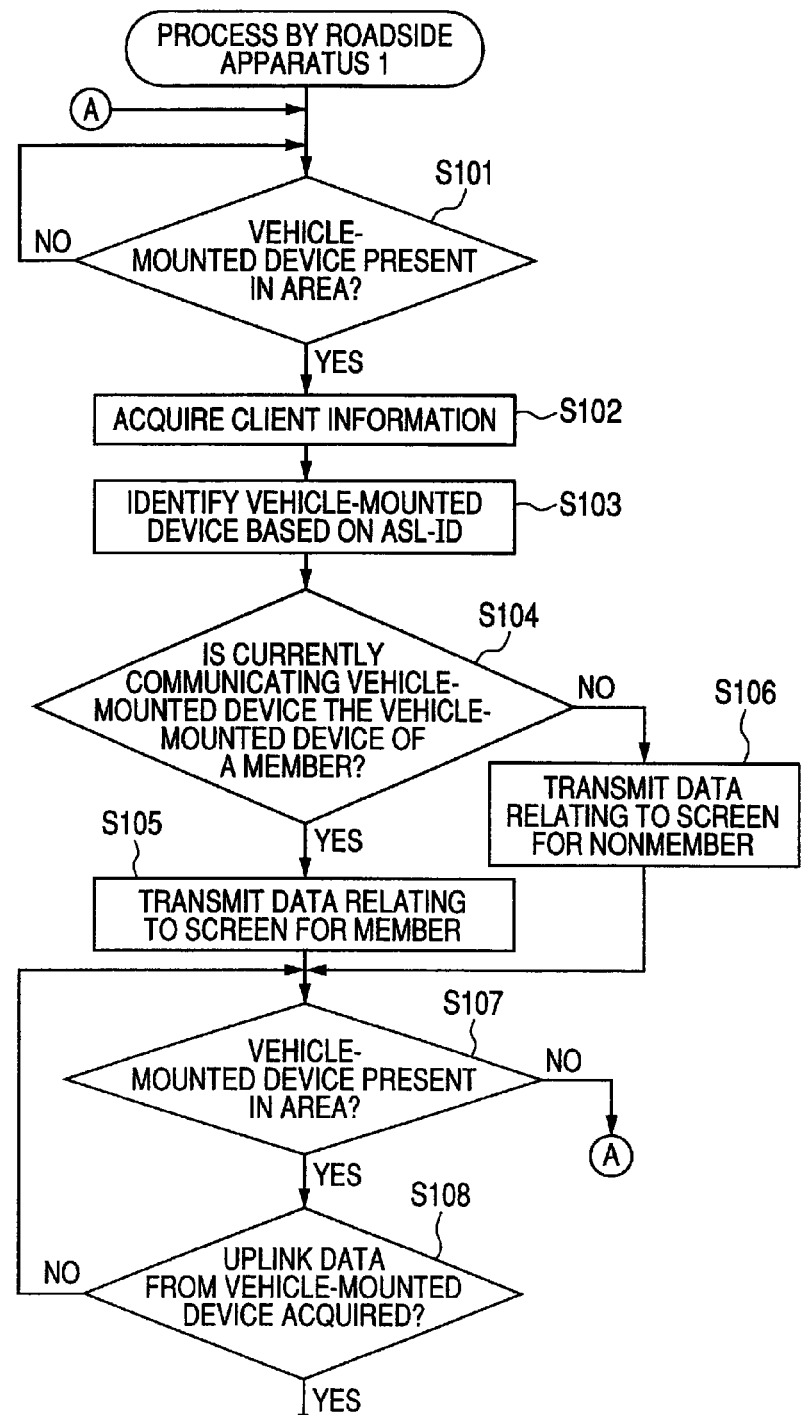
FIG. 8 is a flow chart showing an example of a process by a roadside apparatus 1.

FIG. 8 is a flow chart showing an example of a process by roadside apparatus executed in the roadside apparatus 2. the process by roadside apparatus 1 is implemented by the CPU 211 of the roadside apparatus 2 executing the process by roadside apparatus program in the ROM 212.

In FIG. 8, in step S101, it is determined whether the vehicle-mounted device 5 is present within the roadside area Z (see FIG. 3) that is the communication range covered by the roadside apparatus 2. Specifically, it is determined whether the DSRC communication is established between the roadside apparatus 2 and the vehicle-mounted device 5. When the vehicle-mounted device 5 is present within the area, the operation proceeds to the next step S102, and if the vehicle-mounted device 5 is not present within the area, the process in step S101 is repeated.

In step S102, the client information stored in the storage unit 523 of the DSRC section 52 is acquired. The acquired client information is stored in the storage unit 24 of the roadside apparatus 2.

In step S103, the vehicle-mounted device 5 to be a communication party is identified based on the ASL-ID contained in the client information acquired in step S102.

In step S104, it is determined whether the vehicle-mounted device 5 identified in step S103 is the vehicle-mounted device of the member. The member means an individual or a corporate that has contracted with a service provider for reception of service (service of providing various contents) from the service provider. When the determination shows that the vehicle-mounted device 5 is the vehicle-mounted device of the member, the operation proceeds to the next step S105, and if it was not the vehicle-mounted device of the member, the operation proceeds to step S106.

In step S105, data relating to screen for member (e.g., members' advantage screen) is transmitted to the vehicle-mounted device 5 based on the client information acquired in step S102. The data relating to screen for member, arranged in a multimedia content format, notifies the vehicle-mounted device 5 of the service provider code (which is contained in ID=01).

In step S106, data relating to screen for nonmember (e.g., public information, member invitation information) is transmitted to the vehicle-mounted device 5.

In step S107, it is determined whether the vehicle-mounted device 5 is present within the roadside area Z (see FIG. 3) that is the communication range covered by the roadside apparatus 2. When the vehicle-mounted device 5 is present within the area, the operation proceeds to the next step S108, and if the vehicle-mounted device 5 is not present within the area, the operation proceeds to step S101.

In step S108, it is determined whether the uplink data transmitted from the vehicle-mounted device 5 is acquired. When the uplink data is acquired, the operation proceeds to the next step S109, and if the uplink data is not acquired, the operation proceeds to step S107.

In step S109, it is determined whether transmission data at the previous transmission date and the current data for transmission is the same. This determination is performed based on the data transmission date stored in the storage unit 24 of the roadside apparatus 2. When the transmission data at the previous transmission date and the current data for transmission is the same, the operation proceeds to the next step S110, and if the transmission data at the previous transmission date and the current data for transmission is not the same, the operation proceeds to step S112.

In step S110, it is determined whether the reception/reproduction history information included in the acquired uplink data is inconsistent with the content for transmission. The determination is performed based on the reception information code described in the reception/reproduction history information. When the reception/reproduction history information is inconsistent with the content for transmission, the operation proceeds to the next step S111, and if it agrees with the content for transmission, the operation proceeds to step S113. The vehicle-mounted device 5 manages the information code of the received content and the reproduction history of the content as the reception/reproduction history information for each service provider for the uplink transmission. That is, the reception/reproduction history information is managed for each content and not for each ID number which forms the content. Therefore, the determination in step S110 is performed for each content.

In step S111, the content for transmission that is inconsistent with the reception/reproduction history information is decided to be the transmission information.

In step S112, the whole of the current content for transmission is decided to be the transmission information. In step S113, the current date is saved in the storage unit 24 of the roadside apparatus 2 as data transmission date.

In step S114, it is determined whether the vehicle-mounted device 5 is present within the roadside area Z (see FIG. 3) that is the communication range covered by the roadside apparatus 2. When the vehicle-mounted device 5 is present within the area, the operation proceeds to the next step S115, and if the vehicle-mounted device 5 is not present within the area, the process proceeds to step S101.

In step S115, the transmission information decided in steps S111 or S112 is transmitted to the vehicle-mounted device 5.

In the case where it is determined that the reception/reproduction history information agrees with the content for transmission ("No" in step S110), the transmission is not performed as the transmission information is not set, thus, the operation proceeds to the next step S116.

In step S116, it is determined whether the transmission information has been transmitted or not. When the transmission information has been transmitted, the operation proceeds to the next step S117, and if the transmission information has not been transmitted, the operation proceeds to step S114.

In step S117, the termination data (see FIG. 5) is transmitted.

Figure 9:
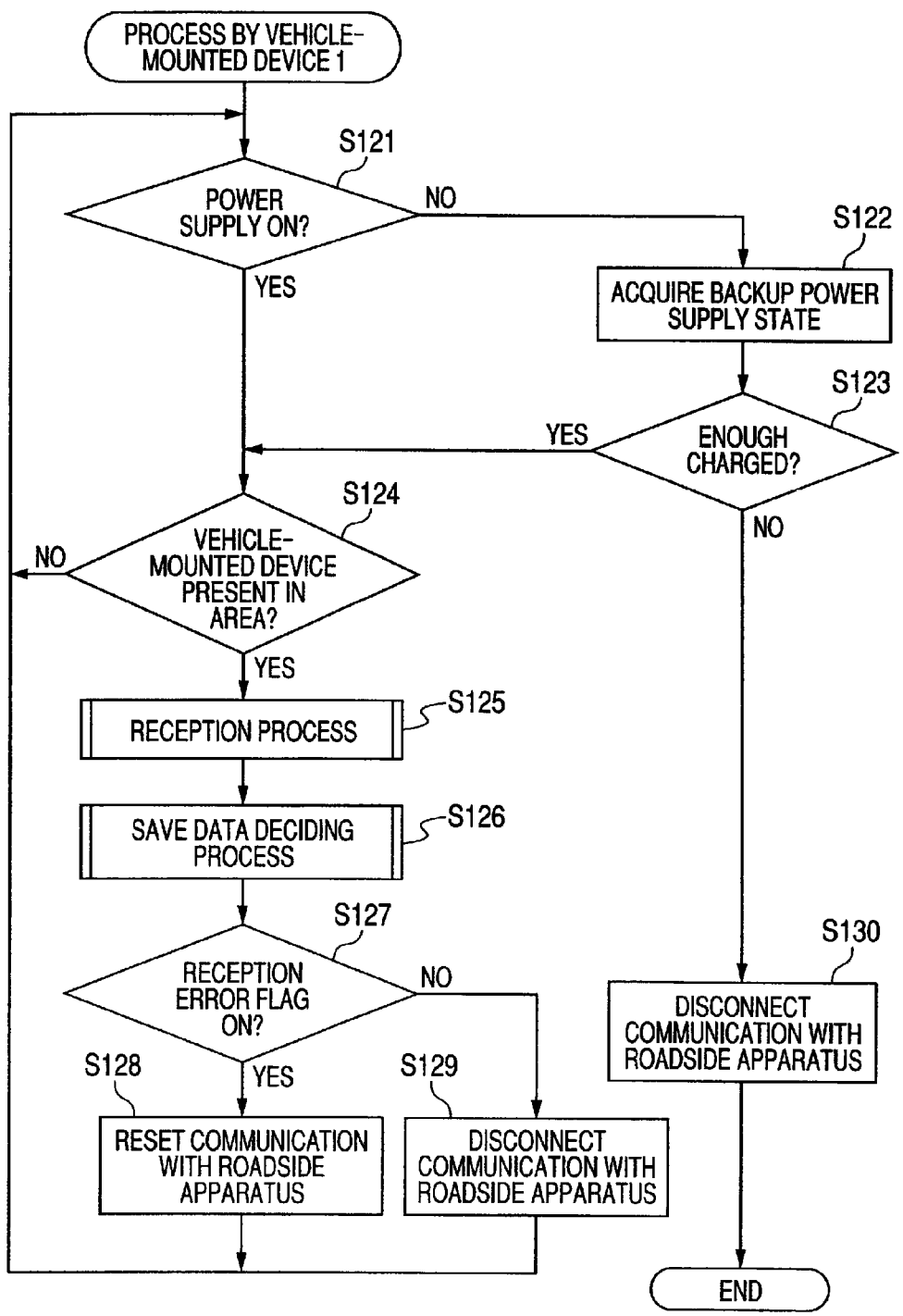
FIG. 9 is a flow chart showing an example of a process by a vehicle-mounted device 1.

FIG. 9 is a flow chart showing an example of a process by vehicle-mounted device 1. the process by vehicle-mounted device 1 is implemented by the CPU 511 executing the process by vehicle-mounted device program in the ROM 512 when the engine of the vehicle C is started.

In FIG. 9, in step S121, it is determined whether the power supply of the vehicle-mounted device 5 is turned on. The state in which the power supply of the vehicle-mounted device 5 is turned on is the state in which the engine of the vehicle C is running. When the power supply of the vehicle-mounted device 5 is turned on, the operation proceeds to step S124, and if the power supply of the vehicle-mounted device 5 is turned off, the operation proceeds to the next step S122.

In step S122, the storage state of a backup power supply of the vehicle-mounted device 5 is acquired.

In step S123, it is determined whether the backup power supply of the vehicle-mounted device 5 is enough charged. When it is enough charged, the operation proceeds to the next step S124, and if it is not enough charged, the operation proceeds to step S130.

In step S124, it is determined whether the vehicle-mounted device 5 is present within the roadside area Z (see FIG. 3) that is the communication range covered by the roadside apparatus 2. When the vehicle-mounted device 5 is present within the area, the operation proceeds to the next step S125, and if the vehicle-mounted device 5 is not present within the area, the operation proceeds to step S121.

In step S125, a reception process is performed. the reception process will be described below with reference to the flow chart of FIG. 10.

Figure 10:
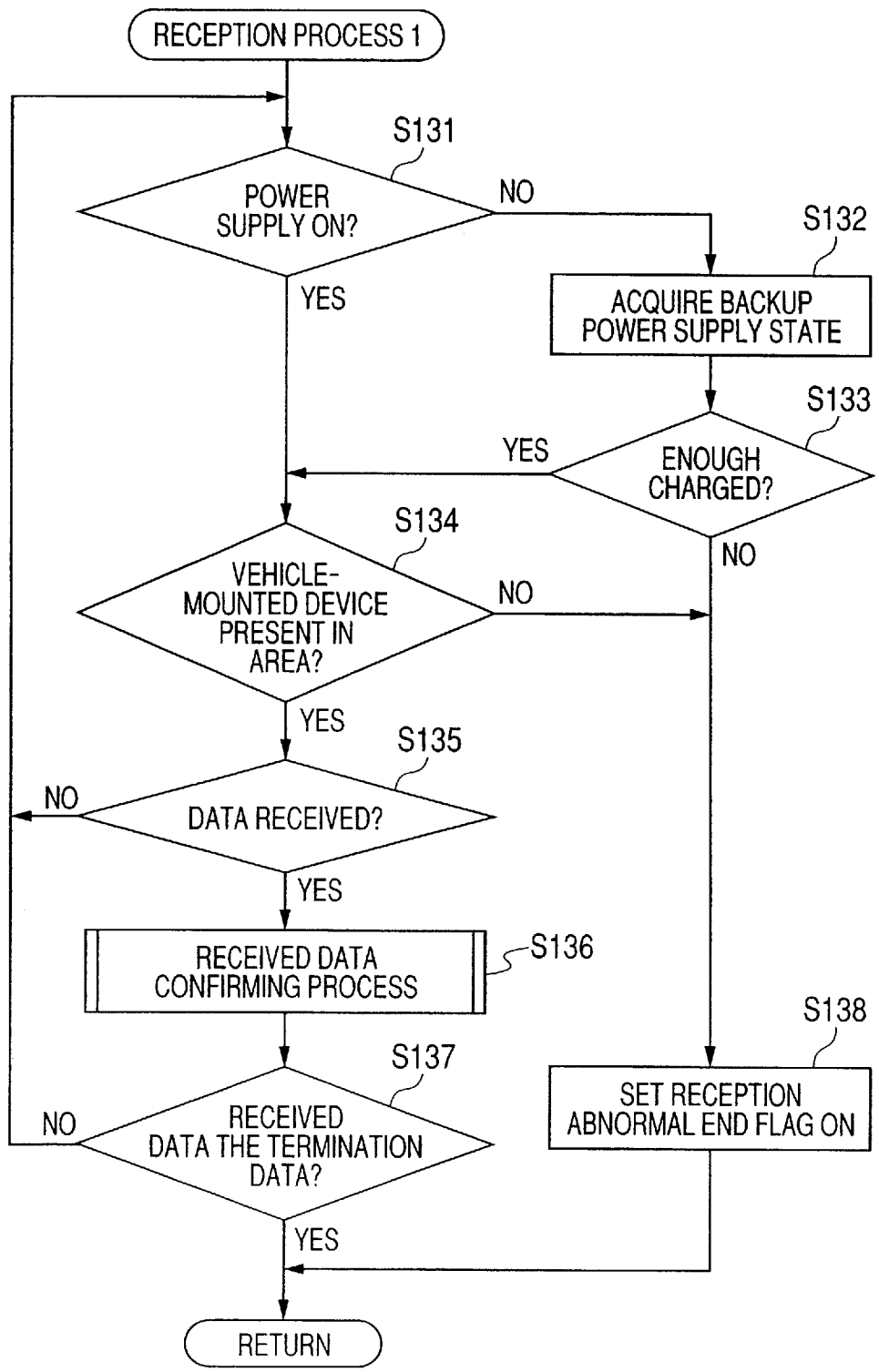
FIG. 10 is a flow chart showing an example of a reception process 1.

FIG. 10 is a flow chart showing an example of a reception process (reception process 1) that is performed when the DSRC communication is established between the vehicle-mounted device 5 and the roadside apparatus 2.

In FIG. 10, in step S131, it is determined whether the power supply of the vehicle-mounted device 5 is turned on. When the power supply of the vehicle-mounted device 5 is turned on, the operation proceeds to step S134, and if the power supply of the vehicle-mounted device 5 is turned off, the operation proceeds to the next step S132. In step S132, the storage state of a backup power supply of the vehicle-mounted device 5 is acquired.

In step S133, it is determined whether the backup power supply of the vehicle-mounted device 5 is enough charged. When it is enough charged, the operation proceeds to the next step S134, and if it is not enough charged, the operation proceeds to step S138.

In step S134, it is determined whether the vehicle-mounted device 5 is present within the roadside area Z (see FIG. 3) that is the communication range covered by the roadside apparatus 2. When the vehicle-mounted device 5 is present within the area, the operation proceeds to the next step S135, and if the vehicle-mounted device 5 is not present within the area, the operation proceeds to step S138.

In step S135, it is determined whether the data transmitted from the roadside apparatus 2 is received. The data to be determined in step S135 is the member/nonmember based image data and the transmission information. When the data is received, the operation proceeds to the next step S136, and if the data is not received, the operation proceeds to step S131.

In step S136, a received data confirming process is performed. The process will be described below with reference to the flow chart of FIG. 11.

Figure 11:
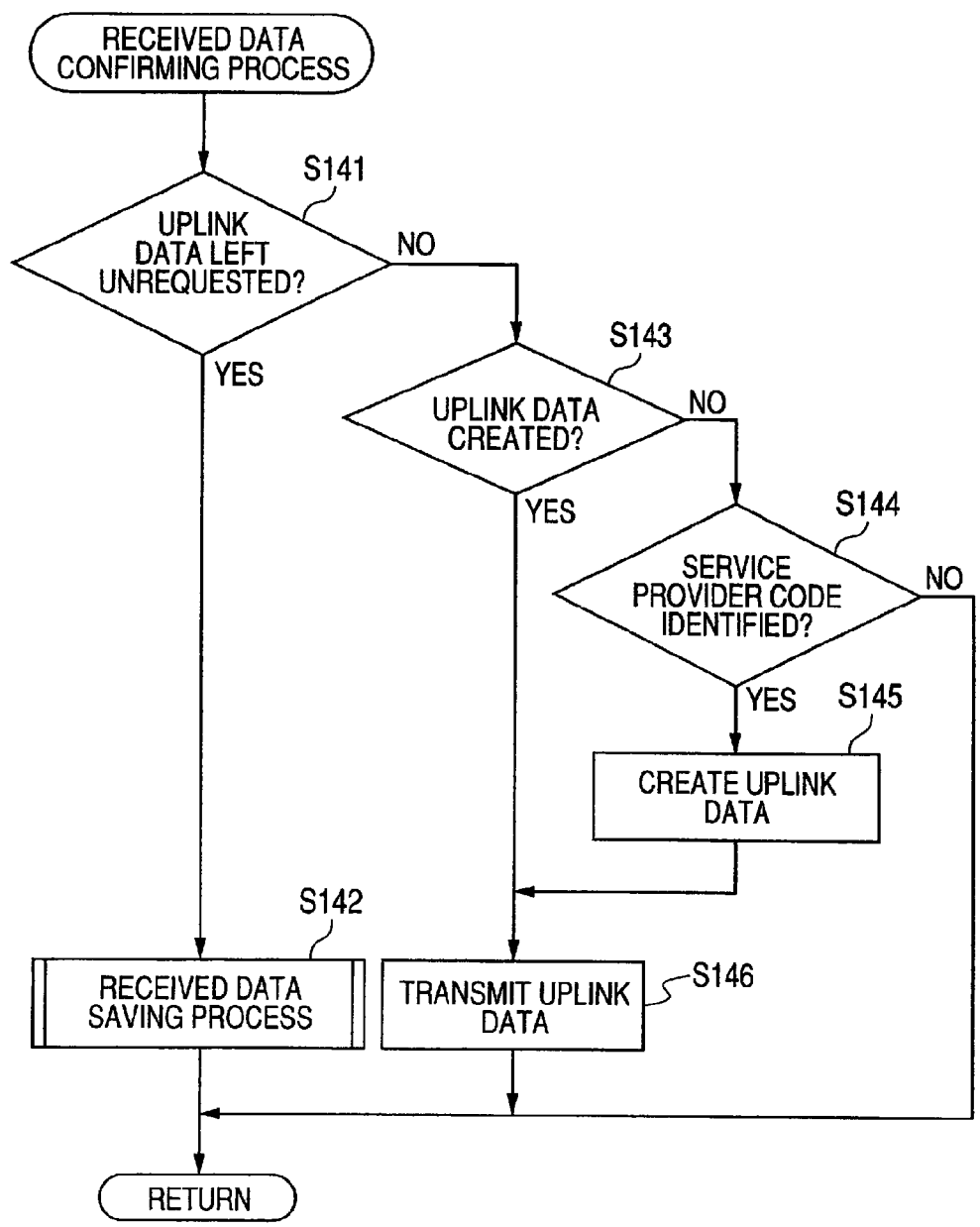
FIG. 11 is a flow chart showing an example of a received data confirming process.

FIG. 11 is a flow chart showing an example of a received data confirming process that is performed when the vehicle-mounted device 5 receives the data transmitted from the roadside apparatus 2.

In FIG. 11, in step S141, it is determined whether the roadside apparatus 2 leaves the uplink data unrequested.

When the vehicle-mounted device 5 has received the data relating to screen for member, the service provider code included in the data is read, and if the service provider code agrees with the service provider code that has been registered in the vehicle-mounted device 5, the uplink data is transmitted.

When the uplink data is left unrequested, the operation proceeds to the next step S142, and if the uplink data is requested, the operation proceeds to step S143.

In step s142, the received data saving process is performed. the process will be described with reference to the flow chart of FIG. 12.

Figure 12:
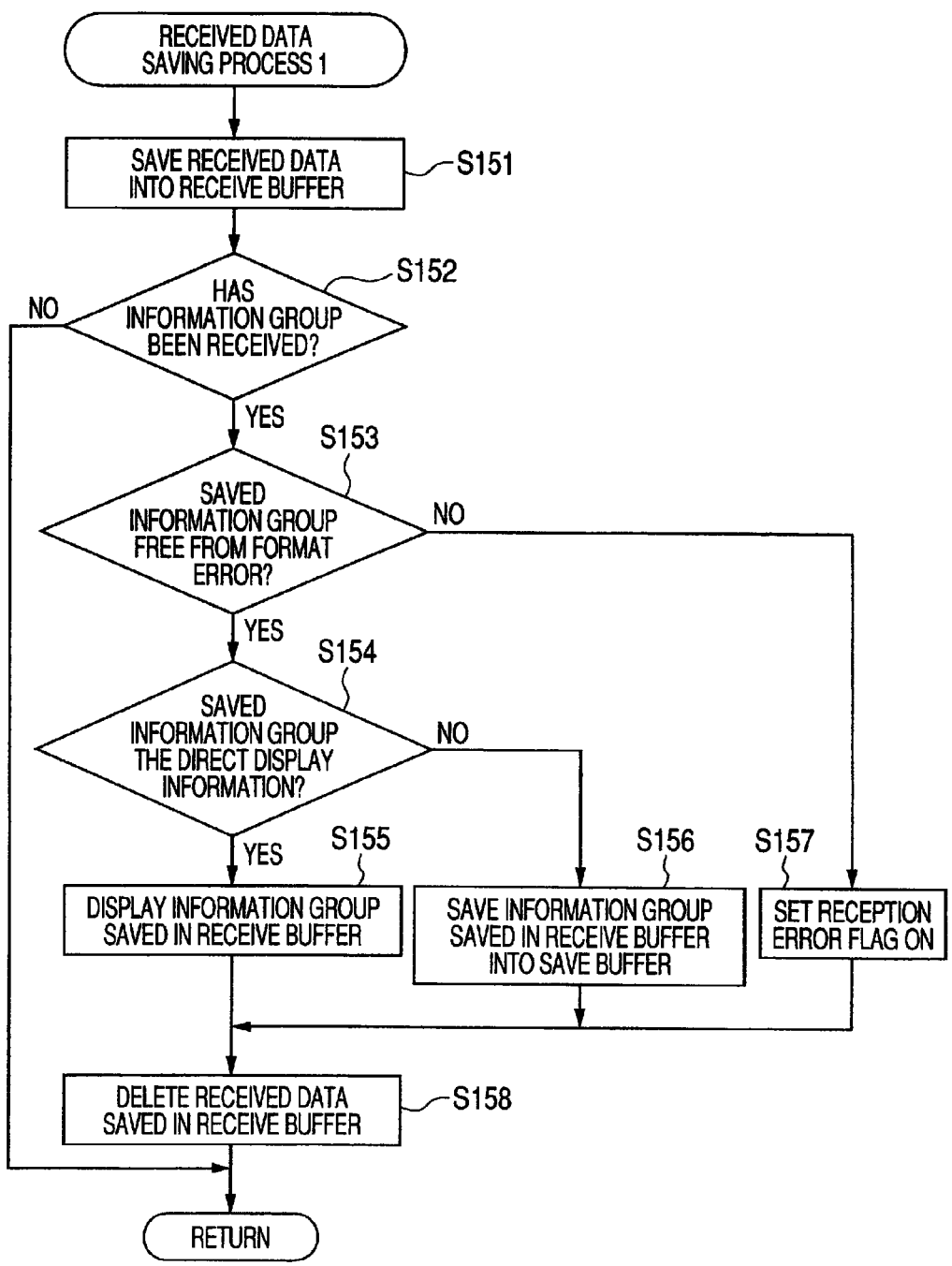
FIG. 12 is a flow chart showing an example of a received data saving process 1.

FIG. 12 is a flow chart showing an example of a received data saving process (received data saving process 1) that is performed if the roadside apparatus leaves the uplink data unrequested after the vehicle-mounted device 5 received the data transmitted from the roadside apparatus 2.

In FIG. 12, in step S151, the received data is saved in the receive buffer provided in the storage unit 523 of the DSRC section 52.

In step S152, it is determined whether the information group has been received. That is, whether the received data contains the information group (one content.) When the information group has been received, the operation proceeds to the next step S153, and if the information group has not been received, the received data is not saved and the process ends.

In step S153, it is determined whether the information group saved in the receive buffer is free from a format error. When the information group is free from a format error, the operation proceeds to the next step S154, and if it has a format error, the operation proceeds to step S157.

In step S154, it is determined whether the information group saved in the receive buffer is direct reproduction information. This determination is performed by referencing the direct reproduction/storage code described in ID=03. When the saved information group is the direct display information, the operation proceeds to step S155, and if it is not the direct display information, the operation proceeds to step S156.

In step S155, the information group saved in the receive buffer is displayed on the display device that forms the output unit 545.

In step S156, the information group saved in the receive buffer is saved in the save buffer that is provided in the storage unit 523 of the DSRC section 52.

In step S157, a reception error flag is set on.

In step S158, the received data saved in the receive buffer is deleted.

Returning to FIG. 11, in step S143, it is determined whether the uplink data has been created. When the uplink data has been created, the operation proceeds to step S146, and if the uplink data has not been created, the operation proceeds to the next step S144.

In step S144, it is determined whether the service provider code has been identified. When it has been identified, the operation proceeds to the next step S145, and if it has not been identified, the process ends.

In step S145, the uplink data is created based on the identified service provider code.

In step S146, the created uplink data is transmitted to the roadside apparatus 2.

Returning to FIG. 10, in step S137, it is determined whether the received data is the termination data. When it is the termination data, the operation ends, and if it is not the termination data, the operation proceeds to step S131.

In step S138, a reception abnormal end flag is set on.

Returning to FIG. 9, in step S126, a save data deciding process is performed. the process will be described below with reference to the flow chart of FIG. 13.

Figure 13:
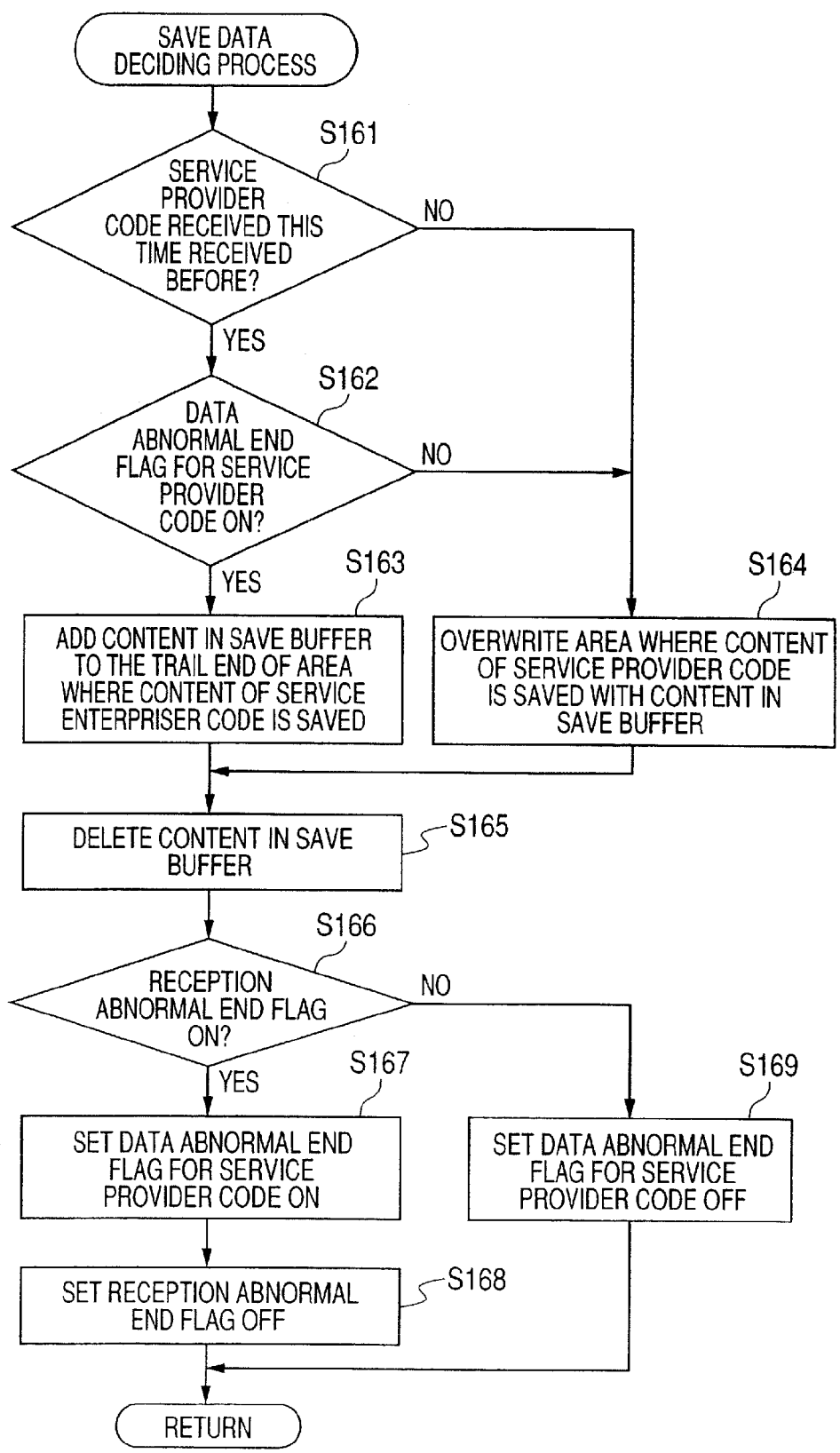
FIG. 13 is a flow chart showing an example of a save data deciding process.

FIG. 13 is a flow chart showing an example of a save data deciding process that is performed when the reception process (see FIG. 10) performed by the vehicle-mounted device 5 ends.

In FIG. 13, in step S161, it is determined whether the service provider code received this time has been received before. When it has been received before, the operation proceeds to the next step S162, and if it has not been received before, the operation proceeds to step S164.

In step S162, it is determined whether a data abnormal end flag for the service provider code is on. When it is on, it means that the normal reception was not performed for some reasons such as the backup power supply of the vehicle-mounted device 5 was not enough charged or the vehicle-mounted device exited the roadside area before it had received the entire data. When the data abnormal end flag is on, the operation proceeds to the next step S163, and if the data abnormal end flag is off, the operation proceeds to step S164.

In step S163, the content saved in the save buffer is added to the end of the area where the content of the service provider code is saved.

In step S164, the area where the content of the service provider code is saved is overwritten with the content saved in the save buffer.

In step S165, the content saved in the save buffer is deleted.

In step S166, it is determined whether the reception abnormal end flag is on. When it is on, it means that the normal reception was not performed for some reasons such as the backup power supply of the vehicle-mounted device 5 was not enough charged or the vehicle-mounted device exited the roadside area before it had received the entire data. When the reception abnormal end flag is on, the operation proceeds to the next step S167, and if the data abnormal end flag is off, the operation proceeds to step S169.

In step S167, the data abnormal end flag for the service provider code is set on.

In step S168, the reception abnormal end flag is set off.

In step S169, the data abnormal end flag for the service provider code is set off. If the data abnormal end flag is off in step S162, the off state is maintained.

Returning to FIG. 9, in step S127, it is determined whether the reception error flag is on. The state where the reception error flag is on is the case where a format error is found in the content received by the vehicle-mounted device 5 (see step S153 in the received data saving process (FIG. 12).) When the reception error flag is on, the operation proceeds to the next step S128, and if the reception error flag is off, the operation proceeds to step S129.

In step S128, the communication with the roadside apparatus 2 is reset, and the operation proceeds to step S121. Here, resetting of the communication is a process for starting the communication from the beginning again, such as turning off the power supply for the vehicle-mounted device 5, suspending the response from the vehicle-mounted device 5 for a certain period of time, and the like.

In step S129, the communication with the roadside apparatus 2 is disconnected, and the operation proceeds to step S121. Here, cutting off of the communication means the end of the communication.

In step S130, the communication with the roadside apparatus 2 is disconnected, and the process ends.

As mentioned above, the roadside apparatus 2 according to the first embodiment is capable of identifying the vehicle-mounted device 5 to be a communication party from the acquired client information, acquiring the uplink data from the vehicle-mounted device 5, and deciding and distributing the transmission content based on the reception/reproduction history information contained in the uplink data. Specifically, the roadside apparatus 2 can pick up and distribute the content that has not been saved in the vehicle-mounted device by referencing the reception/reproduction history information, as it can identify the content saved in the vehicle-mounted device 5.

It may be adapted to transmit all the contents which have not been saved in the vehicle-mounted device 5 from the oldest content in the transmission order.

Second Embodiment

The second embodiment will be described about the case where the roadside apparatus 2 decides and distributes a transmission content based on member information contained in the uplink data transmitted from the vehicle-mounted device 5.

Figure 14:
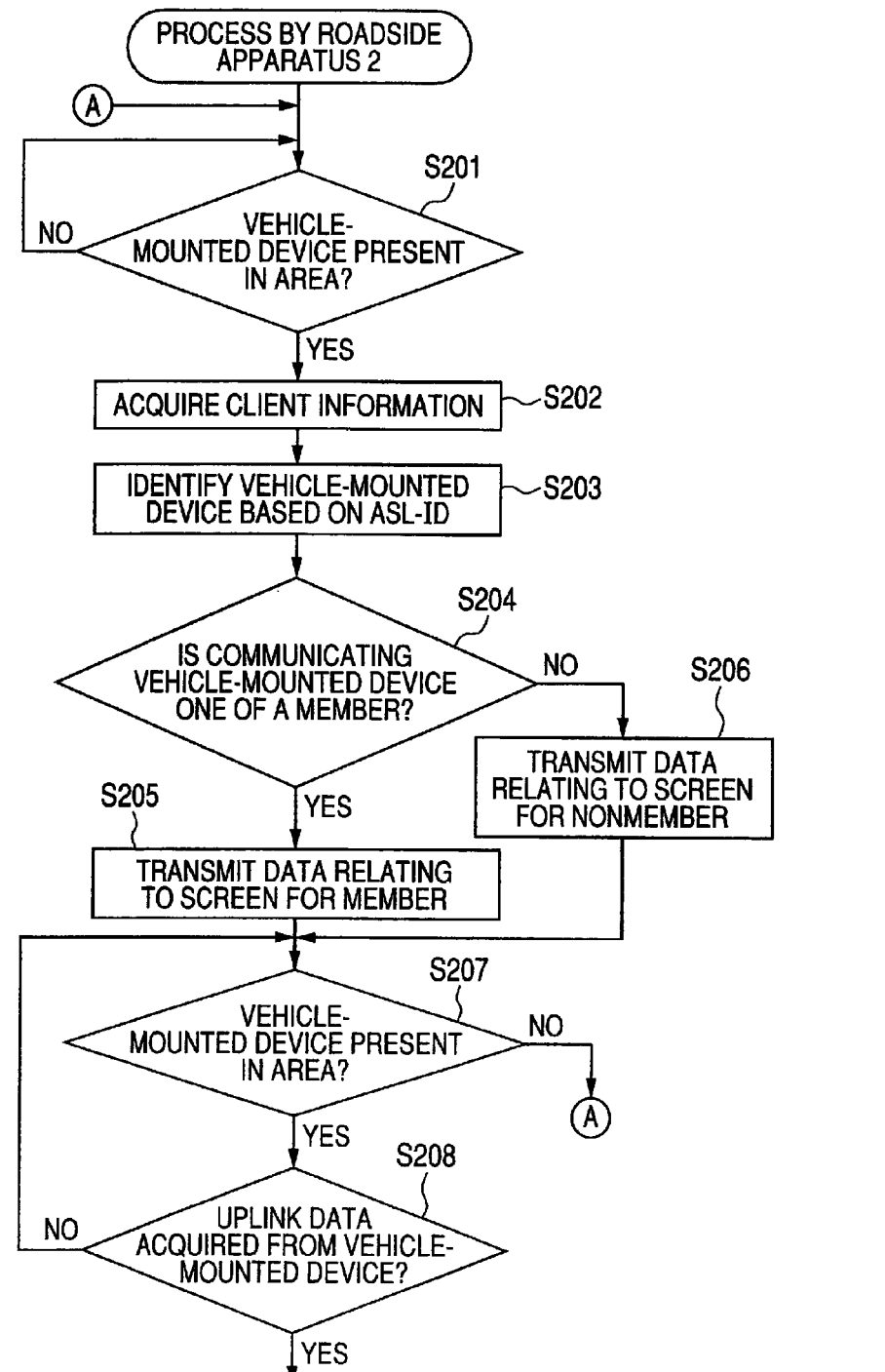
FIG. 14 is a flow chart showing an example of a process by roadside apparatus 2.

FIG. 14 is a flow chart showing an example of a process by roadside apparatus (process by roadside apparatus 2) executed in the roadside apparatus 2.

In FIG. 14, steps S201 to S206 are identical with steps S101 to S106 in FIG. 8 and hence not explained again.

In step S207, it is determined whether the vehicle-mounted device 5 is present within the roadside area Z (see FIG. 3) that is the communication range covered by the roadside apparatus 2. When the vehicle-mounted device 5 is present within the area, the operation proceeds to the next step S208, and if the vehicle-mounted device 5 is not present within the area, the operation proceeds to step S201.

In step S208, it is determined whether the uplink data transmitted from the vehicle-mounted device 5 is acquired. When the uplink data is acquired, the operation proceeds to the next step S209, and if it is not acquired, the operation proceeds to step S207.

In step S209, it is determined whether transmission data at the previous transmission date and the current data for transmission is the same. When the transmission data at the previous transmission date and the current data for transmission is the same, the operation proceeds to the next step S210, and if the transmission data at the previous transmission date and the current data for transmission is not the same, the operation proceeds to step S212.

In step S210, it is determined whether the member information contained in the acquired uplink data contains a final reception ID. When the final reception ID is contained in the member information, the operation proceeds to the next step S211, and if it is not contained in the member information, the operation proceeds to step S212.

In step S211, the last data that agrees with the final reception ID of the data transmitted at the previous time is searched for, and the data next to the searched out data is set as the transmission start data. The data succeeding the transmission start data is decided to be the transmission information.

As the determination can be performed by the unit of ID that forms the information group, the transmission start data may be decided not only at the first data (ID=00) of the information group, but also in the middle of the information group (e.g., ID=01, 02, ... ).

In step S212, the first data of the transmission data is set as the transmission start data. All the current transmission data is decided to be the transmission information.

In step S213, the current date is saved in the storage unit 24 of the roadside apparatus 2 as the data transmission date.

Steps S214 to S217 are identical with steps S114 to S117 in FIG. 8 and hence not explained again.

Figure 15:
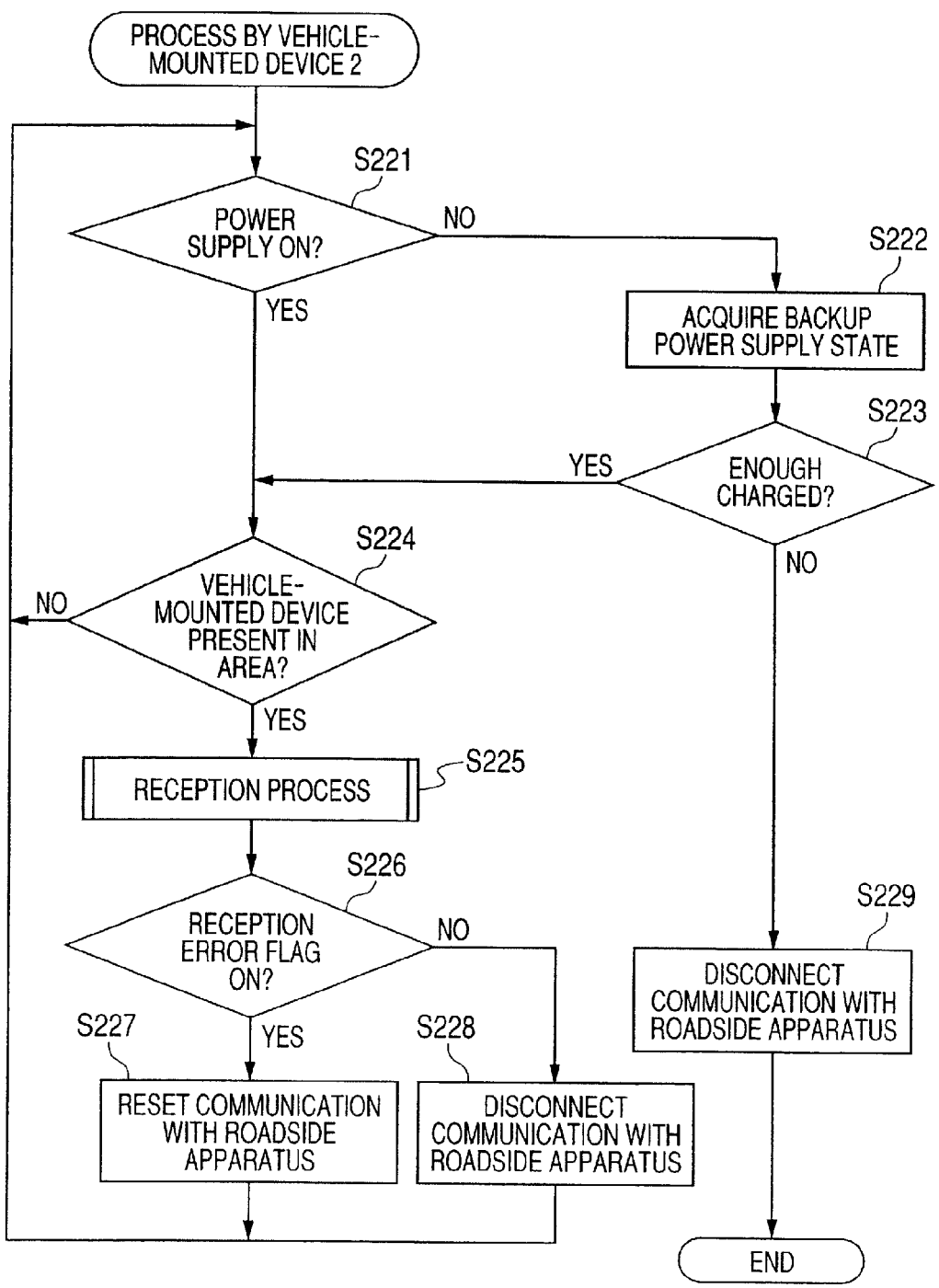
FIG. 15 is a flow chart showing an example of a process by vehicle-mounted device 2.

FIG. 15 is a flow chart showing an example of a process by vehicle-mounted device (process by vehicle-mounted device 2) executed in the vehicle-mounted device 5.

In FIG. 15, steps S221 to S224 are identical with steps S121 to S124 in FIG. 9 and hence not explained again.

In step S225, the reception process is performed. The process will be described below with reference to the flow chart of FIG. 16.

Figure 16:
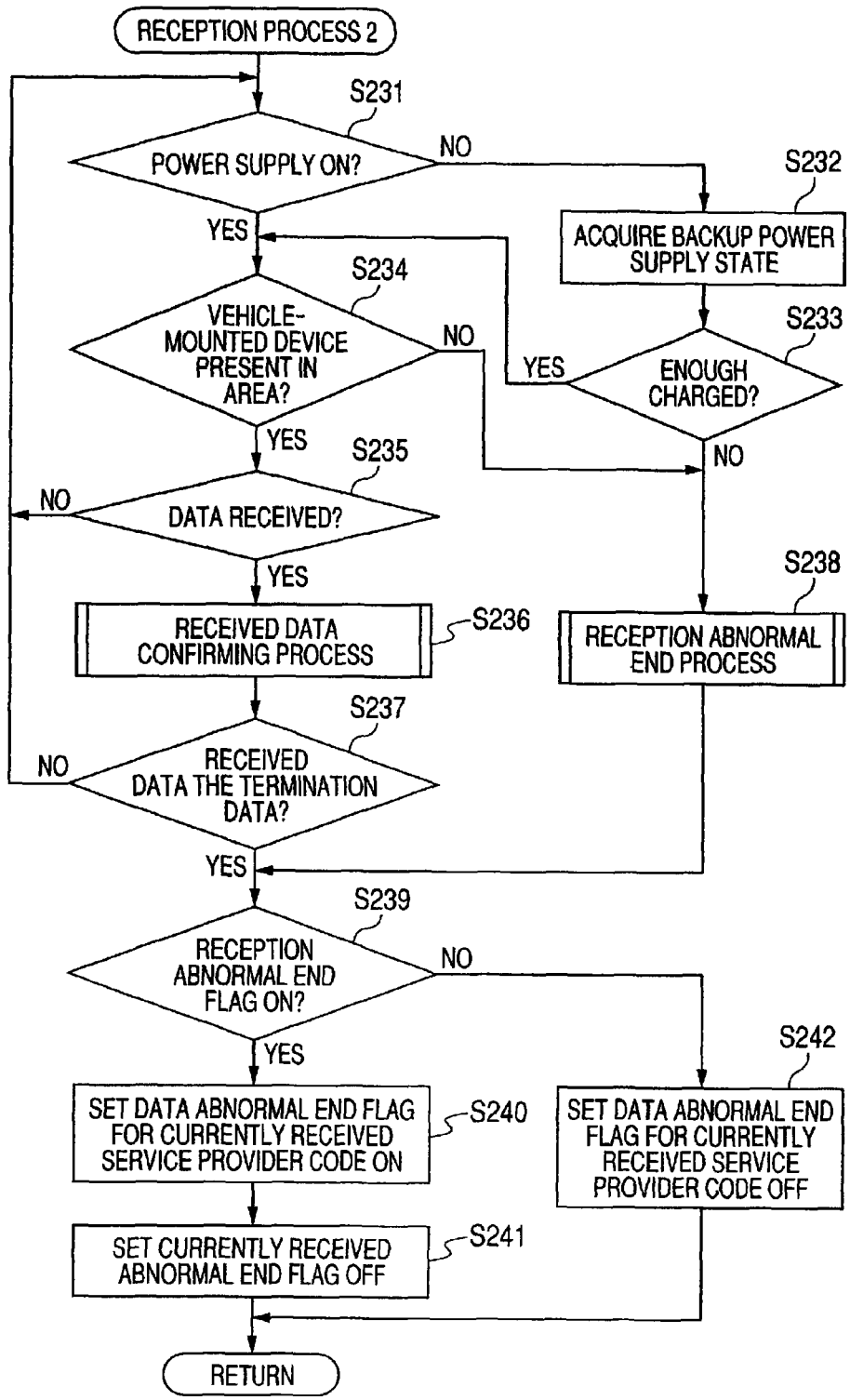
FIG. 16 is a flow chart showing an example of a reception process 2.

FIG. 16 is a flow chart showing an example of a reception process (reception process 2) executed when the DSRC communication is established between the vehicle-mounted device 5 and the roadside apparatus 2.

In FIG. 16, steps S231 to S235 are identical with steps S131 to S135 in FIG. 10 and hence not explained again.

in step s236, the received data confirming process is performed. the process is identical with the received data confirming process executed in the first embodiment (see FIG. 11) and hence not explained again.

the received data saving process executed in the received data confirming process will be described with reference to the flow chart of FIG. 17.

Figure 17:
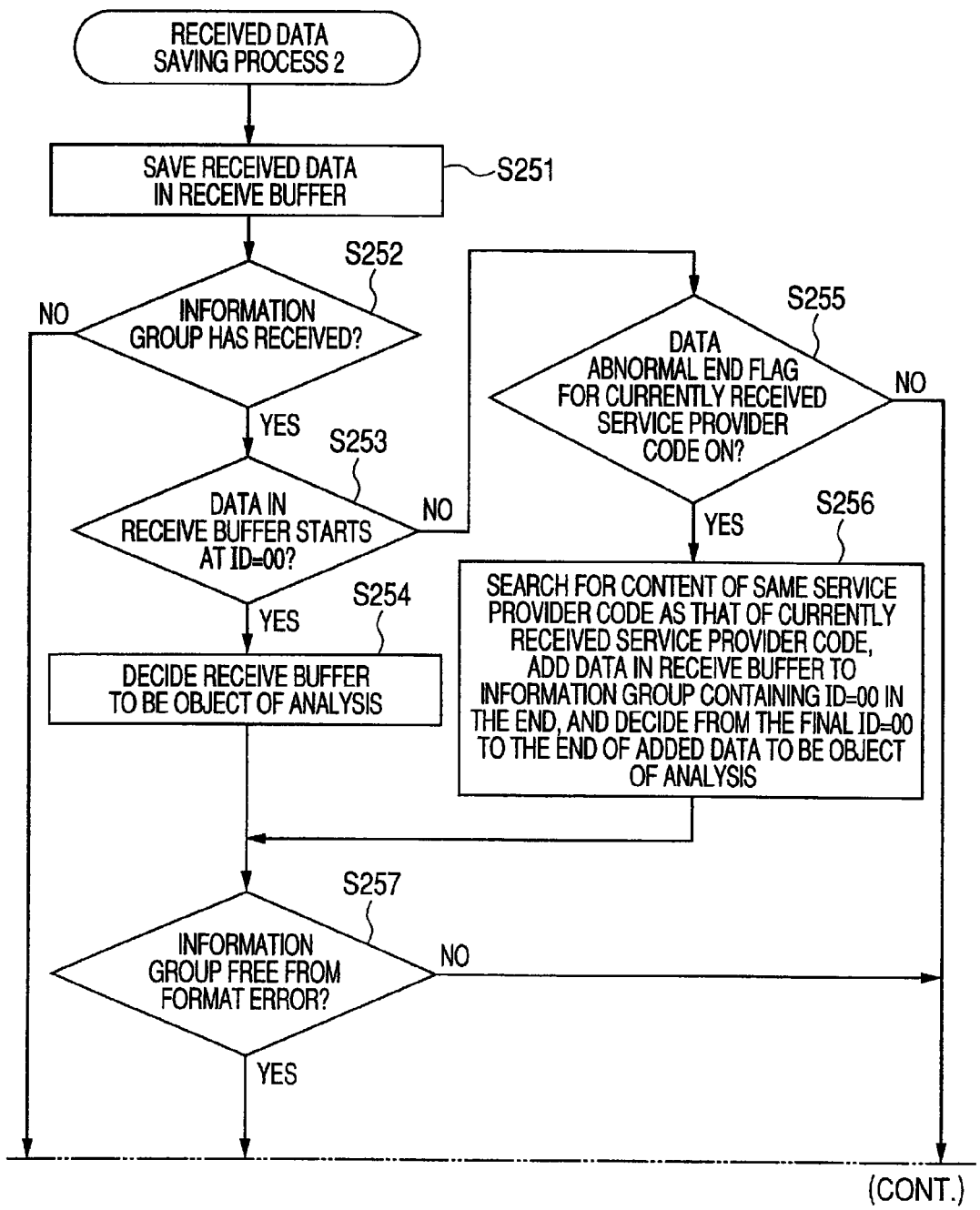
FIG. 17 is a flow chart showing an example of a received data saving process 2.

FIG. 17 is a flow chart showing an example of a received data saving process (received data saving process 2) executed when the roadside apparatus 2 does not issue an uplink data request after the vehicle-mounted device 5 received data transmitted from the roadside apparatus 2.

In FIG. 17, in step S251, the received data is saved in the receive buffer provided in the storage unit 523 of the DSRC section 52.

In step S252, it is determined whether the information group has been received. When the information group has been received, the operation proceeds to the next step S253, and if the information group has not been received, the received data is not saved and the process ends.

In step S253, it is determined whether the data saved in the receive buffer in step S251 starts at ID=00. When the data starts at ID=00, the operation proceeds to the next step S254, and if the data does not start at ID=00, the operation proceeds to step S255.

In step S254, data saved in the receive buffer is decided to be an object of analysis.

In step S255, it is determined whether the data abnormal end flag for the currently received service provider code is on. The state where the data abnormal end flag is on is the case where the normal reception was not performed for some reasons such as the backup power supply of the vehicle-mounted device 5 was not enough charged or the vehicle-mounted device exited the roadside area before it had received the entire data. When the data abnormal end flag is on, the operation proceeds to the next step S256, and if the data abnormal end flag is off, the operation proceeds to step S264.

In step S256, the content of the same service provider code is searched for, the data saved in the receive buffer is added to the last information group that contains ID=00, and from the final ID=00 to the end of the added data is decided to be an object of analysis.

In step S257, it is determined whether the information group saved in the receive buffer is free from a format error. When the information group is free from a format error, the operation proceeds to the next step S258, and if it has a format error, the operation proceeds to step S264.

In step S258, it is determined whether the analyzed information group is direct display information. When the analyzed information group is the direct display information, the operation proceeds to the next step S259, and if it is not the direct display information, the operation proceeds to step S260.

In step S259, the information group saved in the receive buffer is displayed on the display device that forms the output unit 545.

In step S260, it is determined whether a data abnormal end flag for the currently received service provider code is on. When the data abnormal end flag is on, the operation proceeds to the next step S261, and if the data abnormal end flag is off, the operation proceeds to step S262.

In step S261, the data saved in the receive buffer is added to the end of the area where the content of the service provider code is saved.

In step S262, the area where the content of the service provider code is saved is overwritten with the data saved in the receive buffer.

In step S263, the received data saved in the receive buffer is deleted.

In step S264, analysis abnormal end process is performed. The process will be described with reference to the flow chart of FIG. 18.

Figure 18:
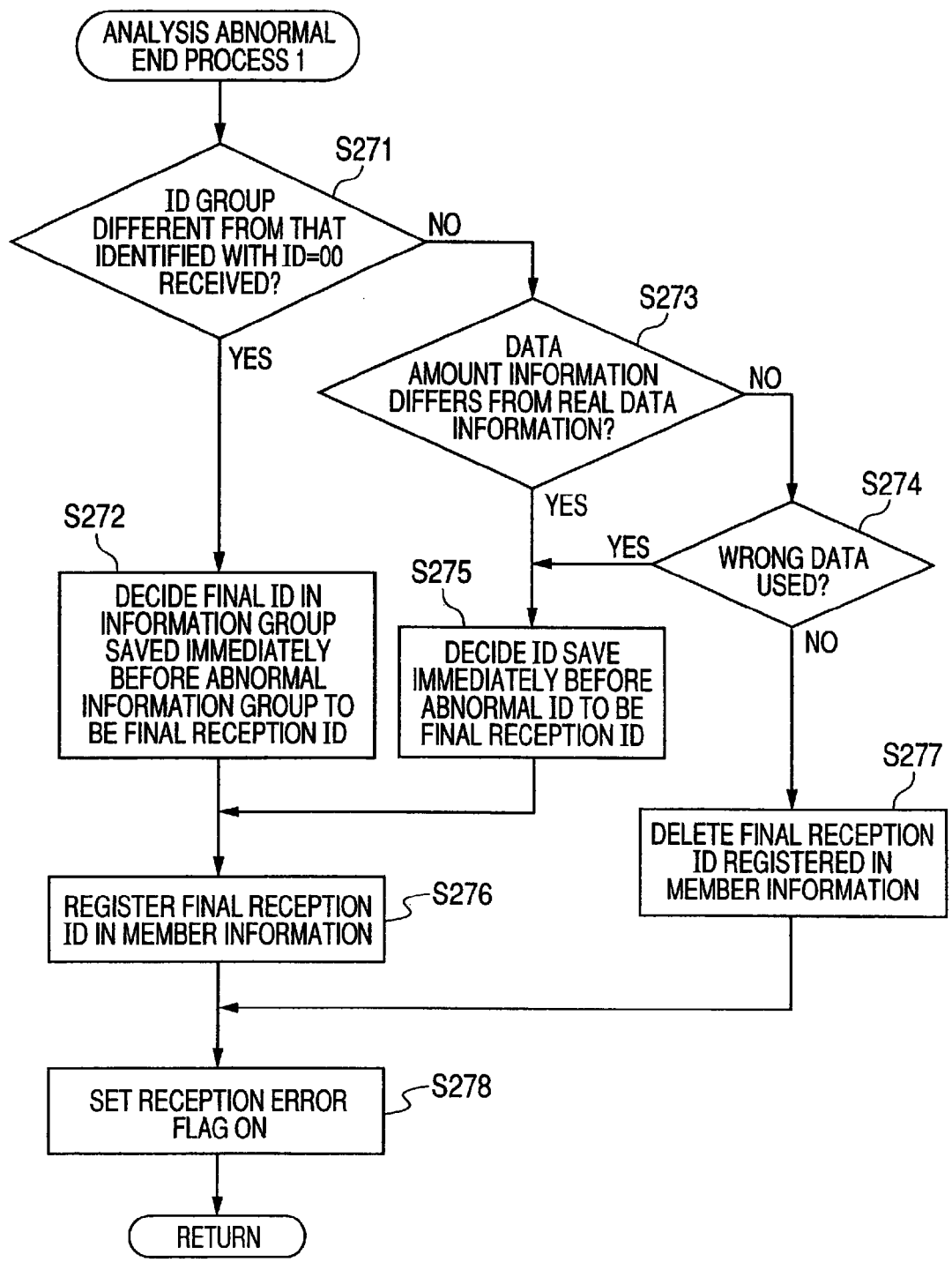
FIG. 18 is a flow chart showing an example of an analysis abnormal end process 1.

FIG. 18 is a flow chart showing an example of an analysis abnormal end process (analysis abnormal end process 1) executed when the data abnormal end flag for the currently received service provider code is off or when the content saved in the receive buffer has a format error.

In FIG. 18, in step S271, it is determined whether the ID group different from that identified with ID=00 has been received. The determination is performed by comparing the ID numbers contained in the actually received information group with the ID group described in the ID=00 (e.g., "00, 01, 02, 03, . . . ".) When the ID group different from that identified with ID=00 is received, the operation proceeds to the next step S272, and if the same ID group identified with ID=00 is received, the operation proceeds to step S273.

In step S272, the final ID in the information group saved immediately before the abnormal information group is decided to be the final reception ID.

In step S273, it is determined whether the data amount information differs from the real data amount. The determination is performed based on the real data information amount described in the header unit of each ID. When the data amount information differs from the real data amount, the operation proceeds to step S275, and if the data amount information agrees with the real data amount, the operation proceeds to the next step S274.

In step S274, it is determined whether wrong data is used. When wrong data is used, the operation proceeds to the next step S275, and if wrong data is not used, the operation proceeds to step S277.

In step S275, the ID saved immediately before the abnormal ID is decided to be the final reception ID.

In step S276, the final reception ID is registered in the member information.

In step S277, the final reception ID registered in the member information is deleted. In the case where "NO" is selected in step S274, the erroneous ID cannot be identified, unlike the cases of an unexpected ID reception ("YES" in step S271), an error in the data amount ("YES" in step S273), or an error in data ("YES" in step S274.) Then, the process of excluding the ID from the objects to be received again (the process in step S277) is performed. If the final reception ID is not registered in the member information, the operation directly proceeds to the next step S278.

In step S278, the reception error flag is set on.

Returning to FIG. 16, in step S237, it is determined whether the received data is the termination data. When the received data is the termination data, the operation proceeds to step S239, and if it is not the termination data, the operation proceeds to step S231.

In step S238, a reception abnormal end process is performed. The process will be described with reference to the flow chart of FIG. 19.

Figure 19:
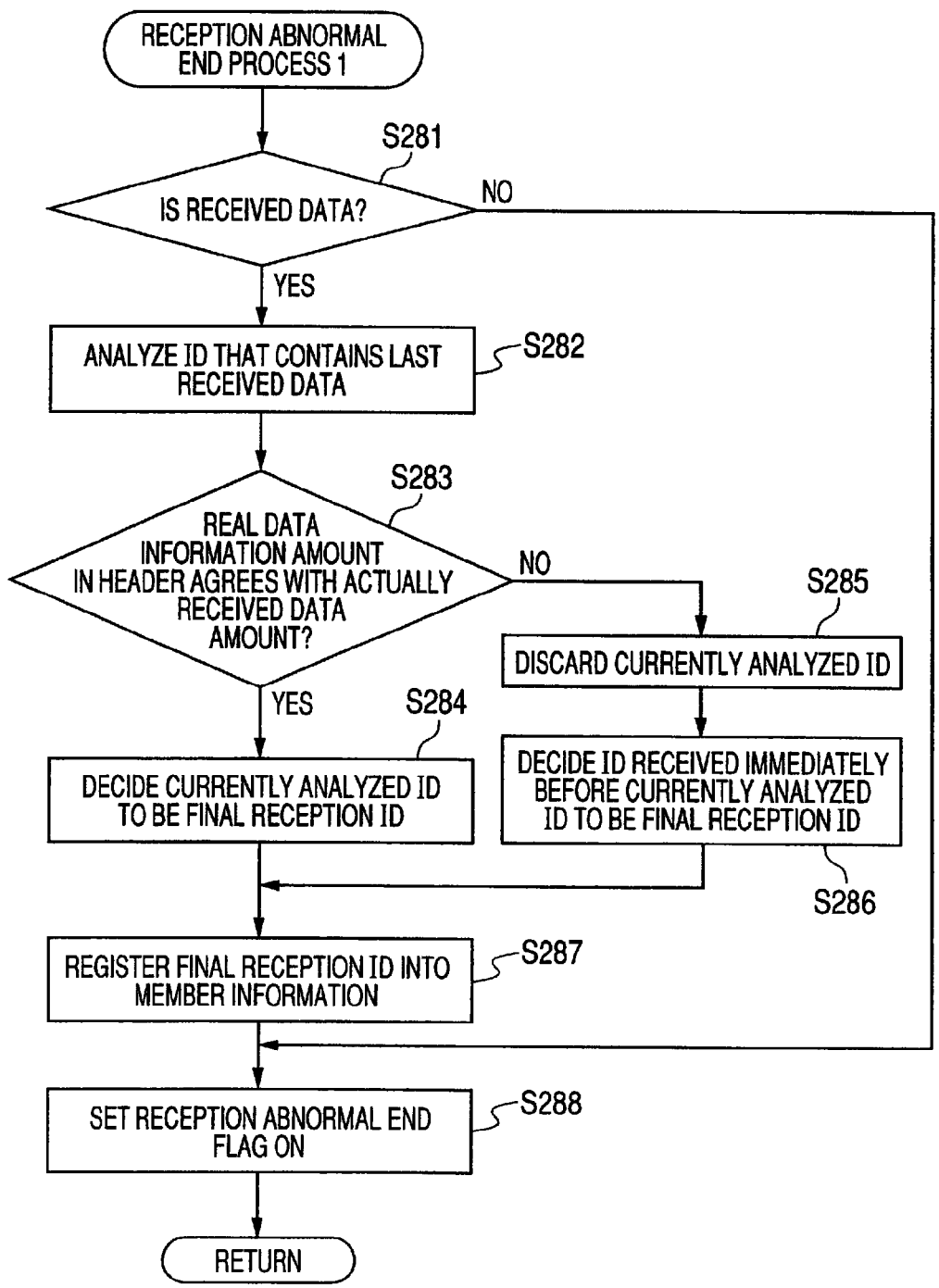
FIG. 19 is a flow chart showing an example of a reception abnormal end process 1.

FIG. 19 is a flow chart showing an example of a reception abnormal end process (reception abnormal end process 1) executed when the backup power supply of the vehicle-mounted device 5 is not enough charged or the vehicle-mounted device exits the roadside area before it has received the entire data in the reception process (see FIG. 16) that is performed in the vehicle-mounted device 5.

In FIG. 19, in step S281, it is determined the presence of received data. When there is received data, the operation proceeds to the next step S282, and if there is not received data, the operation proceeds to step S288.

In step S282, the ID that contains the last received data is analyzed.

In step S283, it is determined whether the real data information amount in the header unit agrees with the actual received data amount. When they agree, the operation proceeds to the next step S284, and if they do not agree, the operation proceeds to step S285.

In step S284, the currently analyzed ID is decided to be the final reception ID.

In step S285, the currently analyzed ID is discarded.

In step S286, the ID received immediately before the currently analyzed ID is decided to be the final reception ID.

In step S287, the final reception ID is registered in the member information.

In step S288, the reception abnormal end flag is set on.

Returning to FIG. 16, in step S239, it is determined whether the reception abnormal end flag is on. The state where the reception abnormal end flag is on is the case where the normal reception was not performed for some reasons such as that the backup power supply of the vehicle-mounted device 5 was not enough charged or the vehicle-mounted device exited the roadside area before it had received the entire data. When the reception abnormal end flag is on, the operation proceeds to the next step S240, and if the reception abnormal end flag is off, the operation proceeds to step S242.

In step S240, the data abnormal end flag for the currently received service provider code is set on.

In step S241, the reception abnormal end flag is set off.

In step S242, the data abnormal end flag for the currently received service provider code is set off.

Returning to FIG. 15, in step S226, it is determined whether the reception error flag is on. The state where the reception error flag is on is the case where the normal saving was not performed for some reasons such as that the data abnormal end flag for the currently received service provider code is off or the content saved in the receive buffer has a format error. When the reception error flag is on, the operation proceeds to the next step S227, and if the reception error flag is off, the operation proceeds to step S228.

In step S227, the communication with the roadside apparatus 2 is reset, and the operation proceeds to step S221.

In step S228, the communication with the roadside apparatus 2 is disconnected, and the operation proceeds to step S221.

In step S229, the communication with the roadside apparatus 2 is disconnected, and the process ends.

As mentioned above, the roadside apparatus 2 according to the second embodiment is capable of identifying the vehicle-mounted device 5 to be a communication party from the acquired client information, acquiring the uplink data from the vehicle-mounted device 5, and deciding and distributing the transmission content based on the member information contained in the uplink data. Specifically, the roadside apparatus 2 can identify the final reception ID of the data saved in the vehicle-mounted device 5 by referencing the final reception ID written in the member information, and distribute the data from the ID succeeding the final reception ID by matching the data with the data transmission history saved in the roadside apparatus 2.

Third Embodiment

The third embodiment will be described about the case where the roadside apparatus 2 has the service provider code, information providing company code, information code, final reception ID, and reception date contained in the member information that is contained in the uplink data transmitted from the vehicle-mounted device 5, and decides and distributes the transmission content based on the member information.

Figure 20:
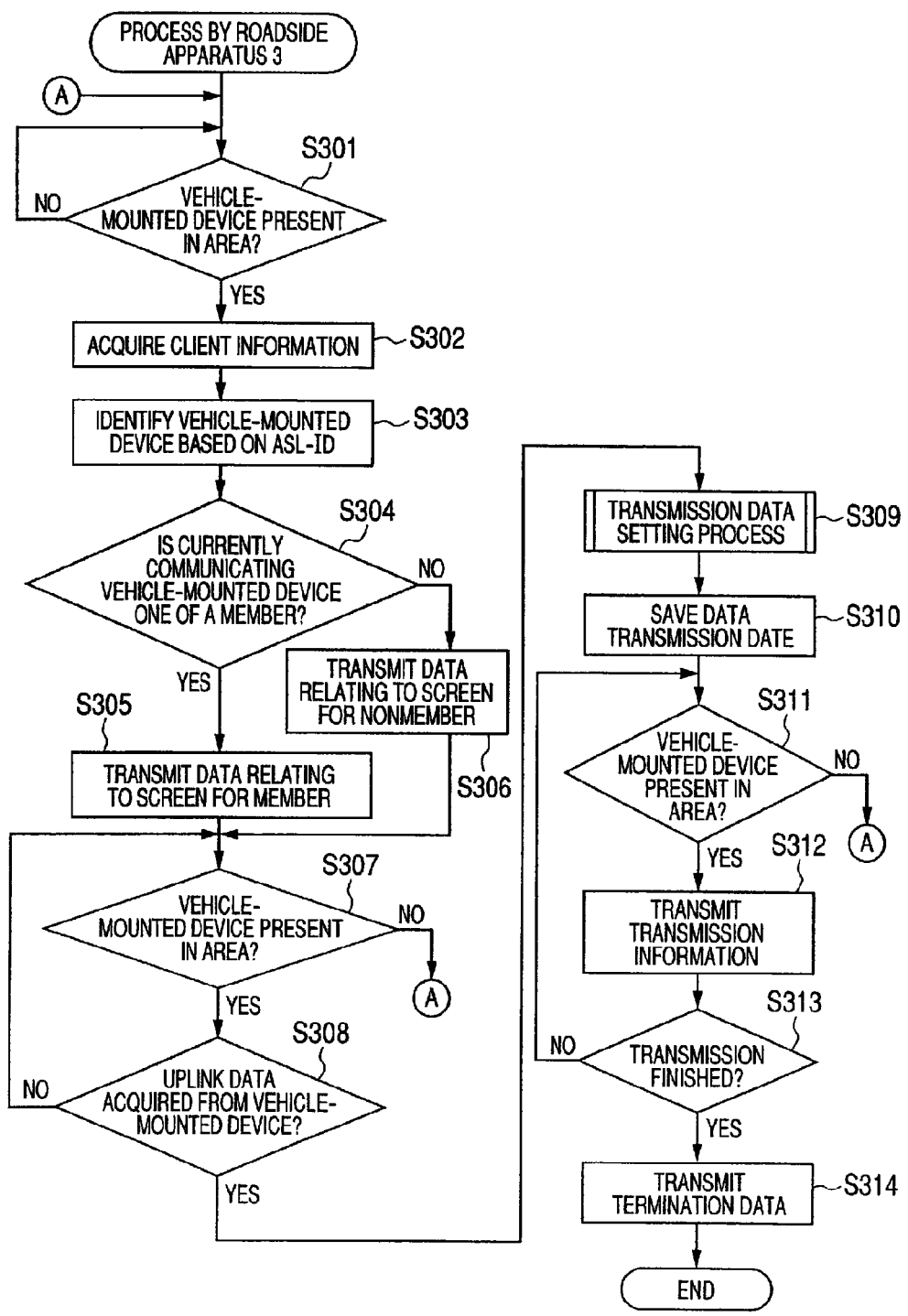
FIG. 20 is a flow chart showing an example of a process by roadside apparatus 3.

FIG. 20 is a flow chart showing an example of a process by roadside apparatus (process by roadside apparatus 3) executed in the roadside apparatus 2.

In FIG. 20, steps S301 to S306 are identical with steps S101 to S106 in FIG. 8 and hence not explained again.

In step S307, it is determined whether the vehicle-mounted device 5 is present within the roadside area Z (see FIG. 3) that is in the communication range covered by the roadside apparatus 2. When the vehicle-mounted device 5 is present within the area, the operation proceeds to the next step S308, and if the vehicle-mounted device 5 is not present within the area, the operation proceeds to step S301.

In step S308, it is determined whether the uplink data transmitted from the vehicle-mounted device 5 is acquired. When the uplink data is acquired, the operation proceeds to the next step S309, and if it is not acquired, the operation proceeds to step S307.

In step S309, transmission data setting process is performed. The process will be described with reference to the flow chart FIG. 21.

Figure 21:
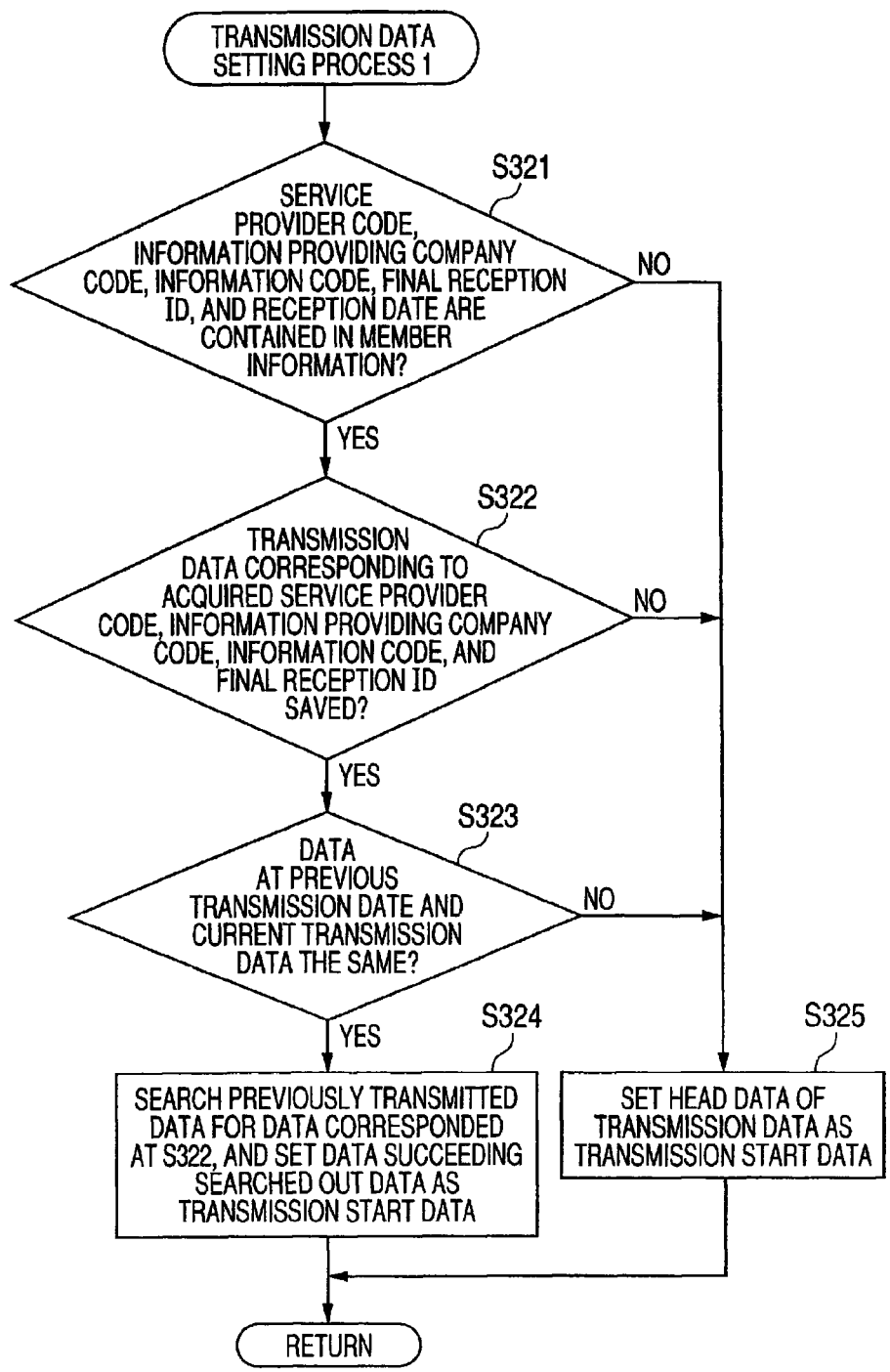
FIG. 21 is a flow chart showing an example of a transmission data setting process 1.

FIG. 21 is a flow chart showing an example of a transmission data setting process (transmission data setting process 1) executed when the uplink data transmitted from the vehicle-mounted device 5 is acquired.

In FIG. 21, in step 321, it is determined whether the service provider code, information providing company code, information code, final reception ID, and reception date are contained in the member information. When they are contained, the operation proceeds to the next step S322, and if they are not contained, the operation proceeds to step S325.

In step S322, it is determined whether the data for transmission corresponding to the acquired service provider code, information providing company code, information code, and final reception ID is saved. When the data for transmission is saved, the operation proceeds to the next step S323, and if the data for transmission is not saved, the operation proceeds to step S325.

In step S323, it is determined whether transmission data at the previous transmission date and the current data for transmission is the same. When the transmission data at the previous transmission date and the current data for transmission are the same, the operation proceeds to the next step S324, and if the transmission data at the previous transmission date and the current data for transmission is not the same, the operation proceeds to step S325.

In step S324, the data transmitted at the previous transmission date is searched for the data corresponding to the acquired service provider code, information providing company code, information code, and final reception ID, and the data succeeding the searched out data is set as the transmission start data. The data succeeding the transmission start data is decided to be the transmission information.

In step S325, the first data of the data for transmission is set as the transmission start data. All the current data for transmission is decided to be the transmission information.

Returning to FIG. 20, in step S310, the current date is saved in the storage unit 24 of the roadside apparatus 2 as the data transmission date.

Steps S311 to S314 are identical with steps S114 to S117 in FIG. 8 and hence not explained again.

the process by vehicle-mounted device, reception process, received data confirming process, received data saving process executed by the vehicle-mounted device 5 according to the third embodiment are identical with those according to the second embodiment and hence not explained again.

Figure 22:
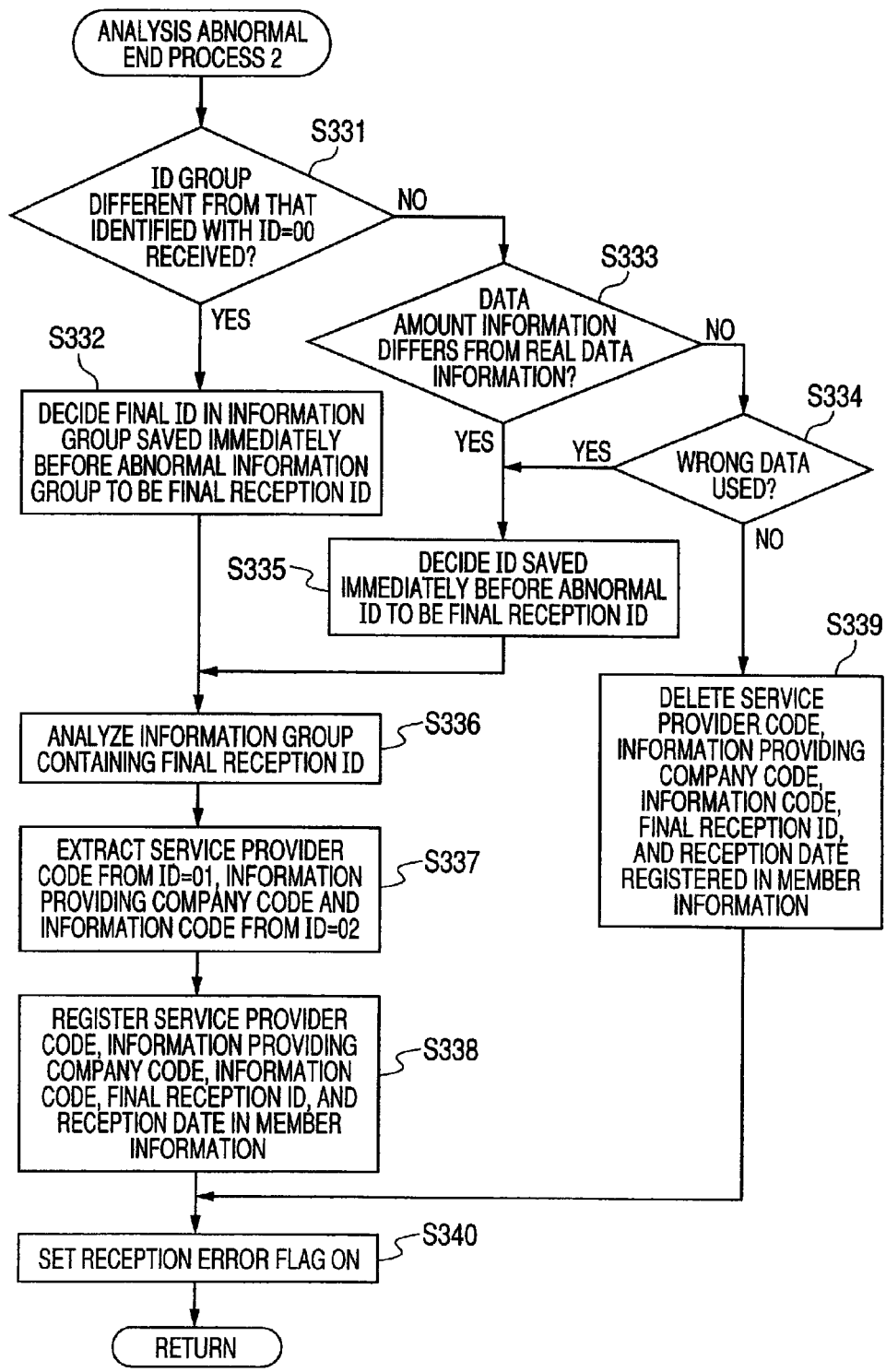
FIG. 22 is a flow chart showing an example of an analysis abnormal end process 2.

FIG. 22 is a flow chart showing an example of an analysis abnormal end process (analysis abnormal end process 2) executed in the received data saving process executed by the vehicle-mounted device 5 (see FIG. 17) when the data abnormal flag for the currently received service provider code is off or when the content saved in the receive buffer has a format error.

In FIG. 22, steps S331 to S335 are identical with steps S271 to S275 in FIG. 8 and hence not explained again.

In step S336, the information group containing the final reception ID is analyzed.

In step S337, the service provider code is extracted from ID=01 and the information providing company code and information code are extracted from ID=02.

In step S338, the service provider code, information providing company code, information code, final reception ID, and reception date are registered in the member information.

In step S339, the service provider code, information providing company code, information code, final reception ID, and reception date registered in the member information are deleted.

In step S340, the reception error flag is set on.

Figure 23:
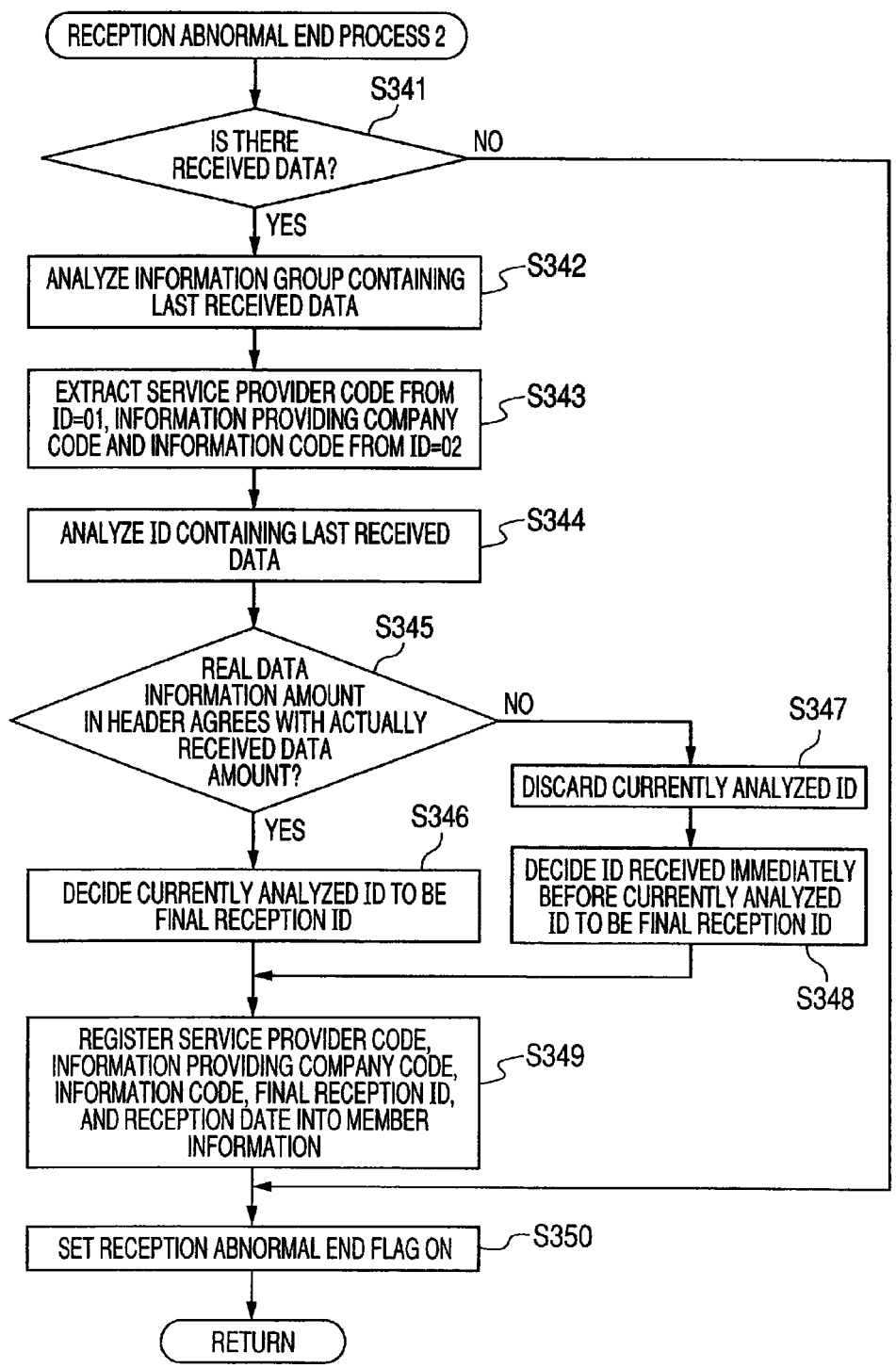
FIG. 23 is a flow chart showing an example of a reception abnormal end process 2.

FIG. 23 is a flow chart showing an example of a reception abnormal end process (reception abnormal end process 2) executed in the reception process executed by the vehicle-mounted device 5 (see FIG. 16) when the backup power supply of the vehicle-mounted device 5 is not enough charged or the vehicle-mounted device exits the roadside area before it has received the entire data.

In FIG. 23, in step S341, the presence of received data is determined. When there is received data, the operation proceeds to the next step S342, and if there is not received data, the operation proceeds to step S350.

In step S342, the information group that contains the last received data is analyzed.

In step S343, the service provider code is extracted from ID=01 and the information providing company code and information code are extracted from ID=02.

In step S344, the ID that contains the last received data is analyzed.

In step S345, it is determined whether the real data information amount in the header unit agrees with the actually received data amount. When they agree, the operation proceeds to the next step S346, and if they do not agree, the operation proceeds to step S347.

In step S346, the currently analyzed ID is decided to be the final reception ID.

In step S347, the currently analyzed ID is discarded.

In step S348, the ID received immediately before the currently analyzed ID is decided to be the final reception ID.

In step S349, the service provider code, information providing company code, information code, final reception ID, and reception date are registered in the member information.

In step S350, the reception abnormal end flag is set on.

As mentioned above, the roadside apparatus 2 according to the third embodiment is capable of identifying the vehicle-mounted device 5 to be a communication party from the acquired client information, acquiring the uplink data from the vehicle-mounted device 5, and deciding and distributing the transmission content based on the member information contained in the uplink data. Specifically, the roadside apparatus 2 can find out the corresponding content saved in the vehicle-mounted device 5 from the final reception ID by referencing the service provider code, information providing company code, information code, final reception ID, and reception date written in the member information so that it can distribute the data from the ID succeeding the final reception ID without identifying the data to start distribution by itself.

Fourth Embodiment

The fourth embodiment only differs from the third embodiment in the transmission data setting process executed by the roadside apparatus 2. Therefore, only the transmission data setting process will be described.

Figure 24:
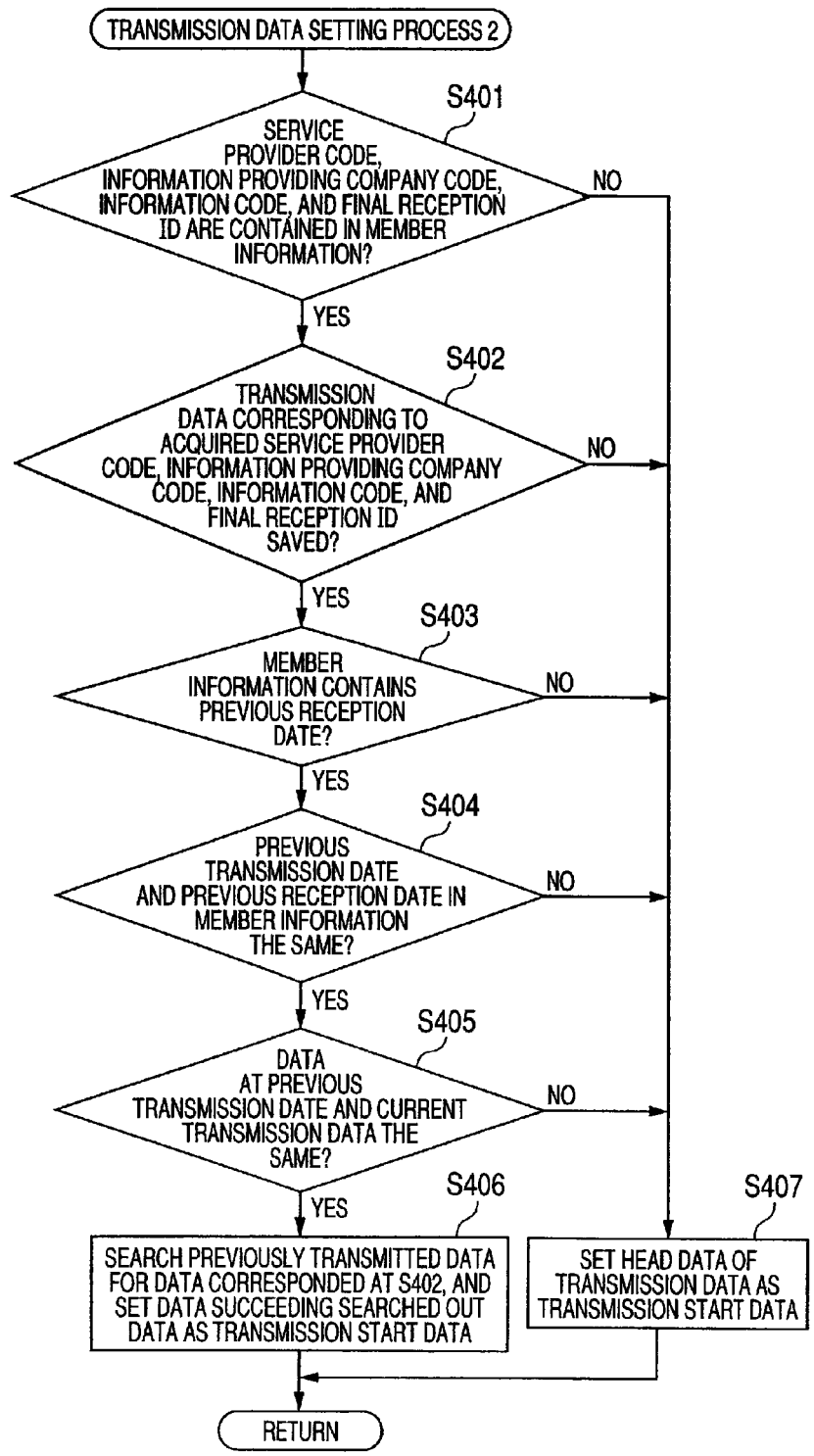
FIG. 24 is a flow chart showing an example of a transmission data setting process 2.

FIG. 24 is a flow chart showing an example of a transmission data setting process (transmission data setting process 2) executed when the uplink data transmitted from the vehicle-mounted device 5 is acquired.

In FIG. 24, in step S401, it is determined whether the service provider code, information providing company code, information code, and final reception ID are contained in the member information. When they are contained, the operation proceeds to the next step S402, and if they are not contained, the operation proceeds to step S407.

In step S402, it is determined whether the data for transmission corresponding to the acquired service provider code, information providing company code, information code, and final reception ID is saved. When the corresponding data for transmission is saved, the operation proceeds to the next step S403, and if the corresponding data for transmission is not saved, the operation proceeds to step S407.

In step S403, it is determined whether the previous reception date is contained in the member information. When it is contained in the member information, the operation proceeds to the next step S404, and if it is not contained in the member information, the operation proceeds to step S407.

In step S404, it is determined whether the previous transmission date and the previous reception date in the member information are the same. When they are the same, the operation proceeds to the next step S405, and if are not the same, the operation proceeds to step S407.

In step S405, it is determined whether the transmission data at the previous transmission date and the current data for transmission are the same. When they are the same, the operation proceeds to the next step S406, and if they are not the same, the operation proceeds to step S407.

In step S406, the data transmitted at the previous date is searched for the data corresponding to the acquired service provider code, information providing company code, information code, and final reception ID, and the data succeeding the searched out data is set as the transmission start data. The data succeeding the transmission start data is decided to be the transmission information.

In step S407, the first data of the data for transmission is set as the transmission start data. All the current data for transmission is decided to be the transmission information.

As mentioned above, unlike the roadside apparatus 2 according to the third embodiment, the roadside apparatus 2 according to the fourth embodiment distributes the data succeeding that received at the previous time only when the previous transmission date and the previous reception date contained in the member information are the same.

That enables the roadside apparatus 2 to perform distribution by a simpler process.

Fifth Embodiment

The fifth embodiment only differs from the third and fourth embodiments in the transmission data setting process executed by the roadside apparatus 2. Therefore, only the transmission data setting process will be described.

Figure 25:
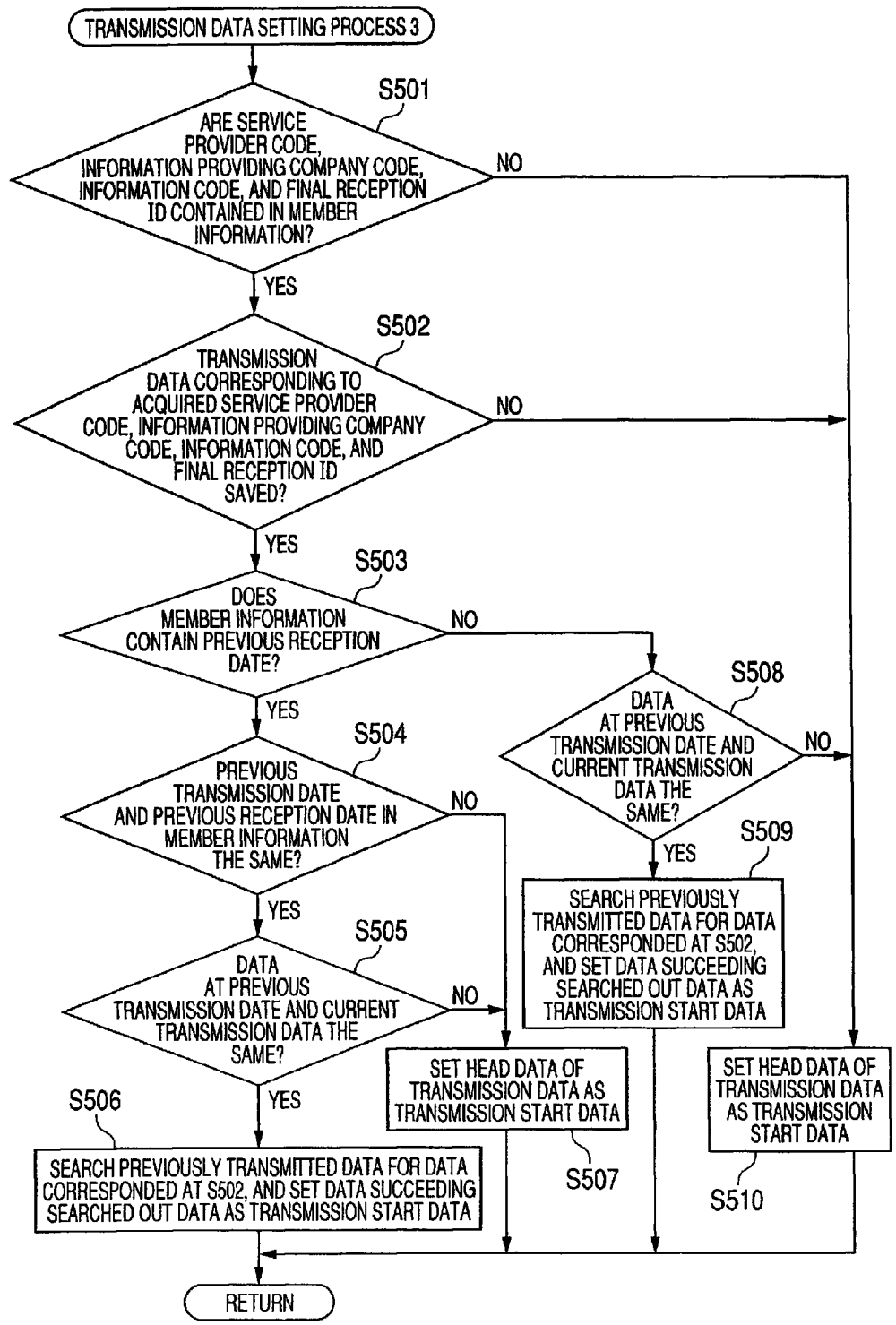
FIG. 25 is a flow chart showing an example of a transmission data setting process 3.

FIG. 25 is a flow chart showing an example of a transmission data setting process (transmission data setting process 3) executed when the uplink data transmitted from the vehicle-mounted device 5 is acquired.

In FIG. 25, in step S501, it is determined whether the service provider code, information providing company code, information code, and final reception ID are contained in the member information. When they are contained, the operation proceeds to the next step S502, and if they are not contained, the operation proceeds to step S510.

In step S502, it is determined whether the data for transmission corresponding to the acquired service provider code, information providing company code, information code, and final reception ID is saved. When the corresponding data for transmission is saved, the operation proceeds to the next step S503, and if the corresponding data for transmission is not saved, the operation proceeds to step S510.

In step S503, it is determined whether the previous reception date is contained in the member information. When it is contained in the member information, the operation proceeds to the next step S504, and if it is not contained in the member information, the operation proceeds to step S508.

In step S504, it is determined whether the previous transmission date and the previous reception date in the member information are the same. When they are the same, the operation proceeds to the next step S505, and if are not the same, the operation proceeds to step S507.

In step S505, it is determined whether the transmission data at the previous transmission date and the current data for transmission are the same. The determination is performed based on the data transmission date stored in the storage unit 24 of the roadside apparatus 2. When they are the same, the operation proceeds to the next step S506, and if they are not the same, the operation proceeds to step S507.

In step S506, the data succeeding the data denoted by the final reception ID is set as the transmission start data. The data succeeding the transmission start data is decided to be the transmission information.

In step S507, the first data of the data for transmission is set as the transmission start data. All the current data for transmission is decided to be the transmission information.

In step S508, it is determined whether the transmission data at the previous transmission date and the current data for transmission are the same. The determination is performed based on the data transmission date stored in the storage unit 24 of the roadside apparatus 2. When they are the same, the operation proceeds to the next step S509, and if they are not the same, the operation proceeds to step S510.

In step S509, the data succeeding the data denoted by the final reception ID is set as the transmission start data. The data succeeding the transmission start data is decided to be the transmission information.

In step S510, the first data of the data for transmission is set as the transmission start data. All the current data for transmission is decided to be the transmission information.

As mentioned above, unlike the roadside apparatus 2 according to the fourth embodiment, the roadside apparatus 2 according to the fifth embodiment determines the necessity of the data distribution by using the previous transmission date saved therein when the previous transmission date is not contained in the member information. Specifically, it distributes the data succeeding that received by the vehicle-mounted device 5 at the previous time only when the transmission data at the previous transmission date and the current data for transmission are the same.

That enables the roadside apparatus 2 to perform distribution by a simpler process even when the previous reception date is not contained in the member information.

Sixth Embodiment the process by roadside apparatus executed by the roadside apparatus 2 according to the sixth embodiment is identical with that in the second embodiment and hence not explained again. The process by vehicle-mounted device, reception process, and received data confirming process executed by the vehicle-mounted device 5 according to the sixth embodiment are also identical with those in the second embodiment and hence not explained again either.

Figure 26:
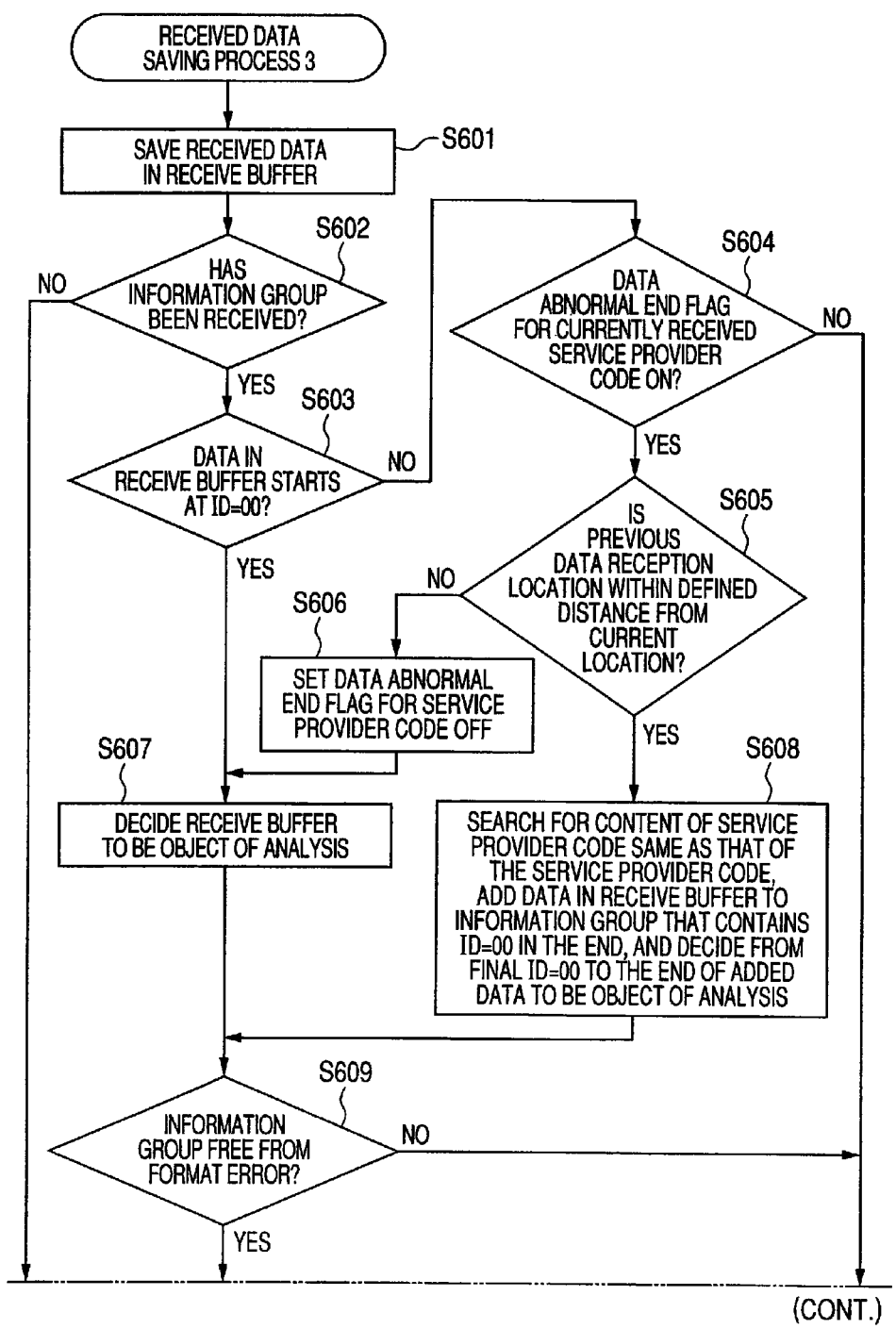
FIG. 26 is a flow chart showing an example of a received data saving process 3.

FIG. 26 is a flow chart showing an example of a received data saving process (received data saving process 3) executed when the an uplink data request is not issued from the roadside apparatus 2 to vehicle-mounted device 5 after the vehicle-mounted device 5 received the data transmitted from the roadside apparatus 2.

In FIG. 26, in step S601, the received data is saved in the receive buffer provided in the storage unit 523 of the DSRC section 52.

In step S602, it is determined whether the information group has been received. When the information group has been received, the operation proceeds to the next step S603, and if the information group has not been received, the received data is not saved and the operation ends.

In step S603, it is determined whether the data saved in the receive buffer in step S601 starts at ID=00. When it starts at ID=00, the operation proceeds to step S607, and if it does not start at ID=00, the operation proceeds to the next step S604.

In step S604, it is determined whether the data abnormal end flag for the currently received service provider code is on. The state where the data abnormal end flag is on is the case where the normal reception was not performed for some reasons such as that the backup power supply of the vehicle-mounted device 5 was not enough charged or the vehicle-mounted device exited the roadside area before it had received the entire data. When the data abnormal end flag is on, the operation proceeds to the next step S605, and if the data abnormal end flag is off, the operation proceeds to step S616.

In step S605, it is determined whether the previous data reception location is within a certain distance from the current location. Here, 'a certain distance' means, for example, the range of the roadside area Z shown in FIG. 3. When it is within a certain distance, the operation proceeds to step S608, and if it is not within a certain distance, the operation proceeds to the next step S606.

Although the certain distance is described as the range of the roadside area Z here, it is not limited to that range.

In step S606, the data abnormal end flag for the service provider code is set off.

In step S607, the data saved in the receive buffer is decided to be the object of analysis.

In step S608, the content of the same service provider code as that of the service provider code is searched for, the data saved in the receive buffer is added to the information group that contains ID=00 in the end, and from the final ID=00 to the end of the added data is decided to be an object of analysis.

In step S609, it is determined whether the information group saved in the receive buffer is free from a format error. When the information group is free from a format error, the operation proceeds to the next step S610, and if it has a format error, the operation proceeds to step S616.

In step S610, it is determined whether the analyzed information group is direct display information. When the analyzed information group is the direct display information, the operation proceeds to the next step S611, and if it is not the direct display information, the operation proceeds to step S612.

In step S611, the information group saved in the receive buffer is displayed on the display device that forms the output unit 545.

In step S612, it is determined whether a data abnormal end flag for the currently received service provider code is on. When the data abnormal end flag is on, the operation proceeds to the next step S613, and if the data abnormal end flag is off, the operation proceeds to step S614.

In step S613, the data saved in the receive buffer is added to the end of the area where the content of the service provider code is saved.

In step S614, the area where the content of the service provider code is saved is overwritten with the data saved in the receive buffer.

In step S615, the received data saved in the receive buffer is deleted.

in step s616, analysis abnormal end process is performed. The process will be described with reference to the flow chart of FIG. 27.

Figure 27:
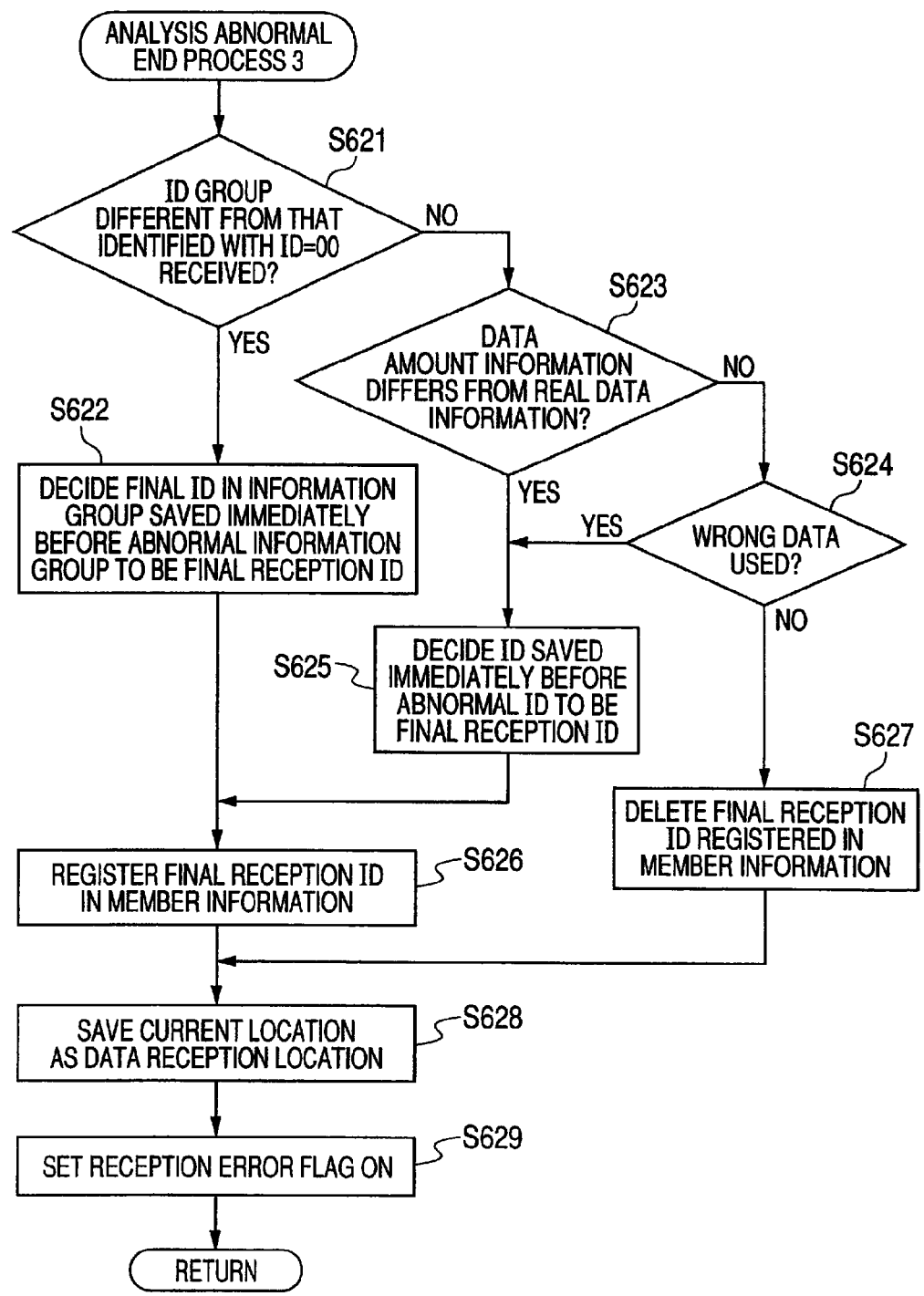
FIG. 27 is a flow chart showing an example of an analysis abnormal end process 3.

FIG. 27 is a flow chart showing an example of an analysis abnormal end process (analysis abnormal end process 3) executed when the data abnormal end flag for the currently received service provider code is off or when the content saved in the receive buffer has a format error.

In FIG. 27, steps S621 to S625 are identical with steps S271 to S275 in FIG. 18 and hence not explained again.

In step S626, the final reception ID is registered in the member information.

In step S627, the final reception ID registered in the member information is deleted.

In step S628, the current location is saved in the storage unit 546 of the car navigation section 54 as the data reception location.

In step S629, the reception error flag is set on.

Figure 28:
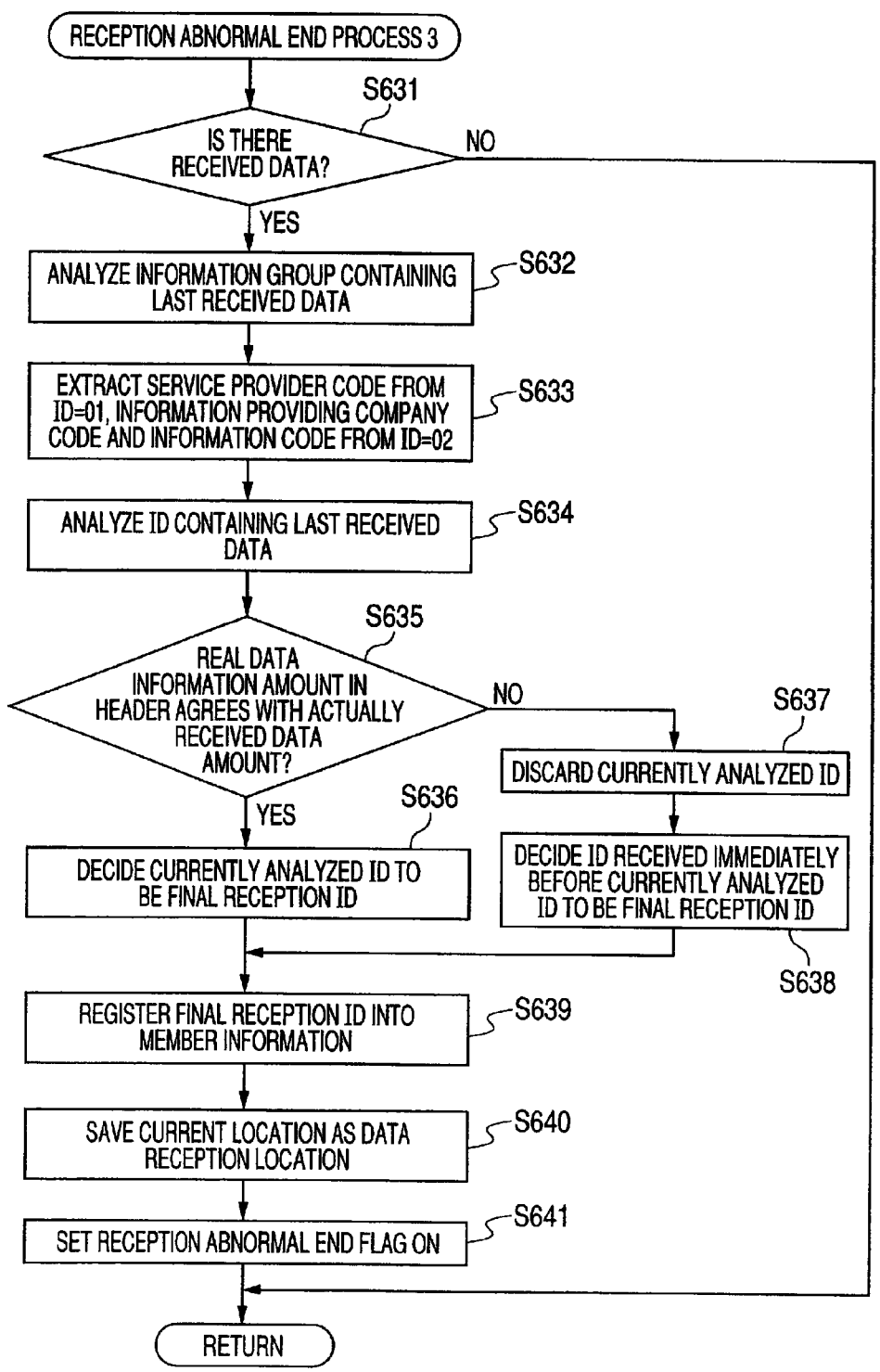
FIG. 28 is a flow chart showing an example of a reception abnormal end process 3.

FIG. 28 is a flow chart showing an example of a reception abnormal end process (reception abnormal end process 3) executed when the backup power supply of the vehicle-mounted device 5 is not enough charged or the vehicle-mounted device exits the roadside area before it has received the entire data in the reception process (see FIG. 16) that is performed in the vehicle-mounted device 5.

In FIG. 28, steps S631 to S638 are identical with steps S341 to S348 in FIG. 23 and hence not explained again.

In step S639, the final reception ID is added to the member information.

In step S640, the current location is saved in the storage unit 546 of the car navigation section 54 as the data reception location.

In step S641, the reception abnormal end flag is set on.

As mentioned above, the vehicle-mounted device 5 according to the sixth embodiment stores the current location when the communication with the roadside apparatus 2 is disconnected. When the communication with the roadside apparatus 2 is resumed, if the previously stored location is within a certain distance from the current location and the service provider code of the previous time agrees with the current one, the vehicle-mounted device 5 recognizes the currently received data as the one that succeeding the previously received data.

The roadside apparatus 2 is capable of deciding and distributing the transmission content based on the location information of the vehicle-mounted device 5. That enables the roadside apparatus 2 to quickly and simply resume the distribution.

Seventh Embodiment the process by roadside apparatus executed by the roadside apparatus 2 according to the seventh embodiment is identical with that in the third embodiment and hence not explained again. the process by vehicle-mounted device, reception process, and received data confirming process executed by the vehicle-mounted device 5 according to the seventh embodiment are also identical with those in the third embodiment and hence not explained again either. The received data saving process executed by the vehicle-mounted device 5 according to the seventh embodiment is identical with that in the sixth embodiment and hence not explained again either.

Figure 29:
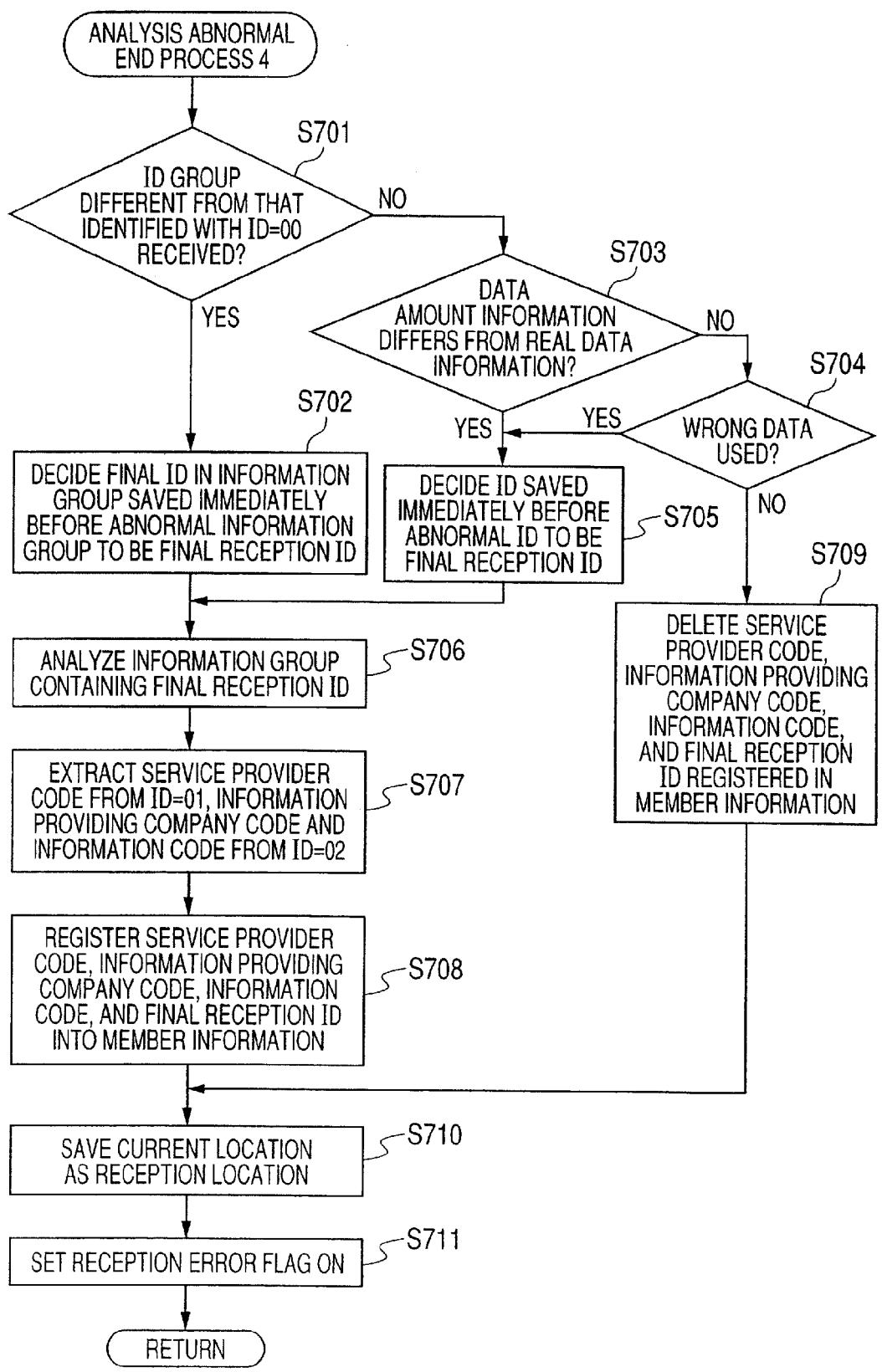
FIG. 29 is a flow chart showing an example of an analysis abnormal end process 4.

FIG. 29 is a flow chart showing an example of an analysis abnormal end process (analysis abnormal end process 4) executed when the data abnormal end flag for the currently received service provider code is off or when the content saved in the receive buffer has a format error.

In FIG. 29, steps S701 to S705 are identical with steps S271 to S275 in FIG. 18 and hence not explained again.

In step S706, the information group containing the final reception ID is analyzed.

In step S707, the service provider code is extracted from ID=01 and the information providing company code and information code are extracted from ID=02.

In step S708, the service provider code, information providing company code, information code, and final reception ID are registered in the member information.

In step S709, the service provider code, information providing company code, information code, and final reception ID registered in the member information are deleted.

In step S710, the current location is saved in the storage unit 546 of the car navigation section 54 as the data reception location.

In step S711, the reception error flag is set on.

FIG. 30 is a flow chart showing an example of a reception abnormal end process (reception abnormal end process 4) executed when the backup power supply of the vehicle-mounted device 5 is not enough charged or the vehicle-mounted device exits the roadside area before it has received the entire data in the reception process (see FIG. 16) that is performed in the vehicle-mounted device 5.

In FIG. 30, steps S721 to S728 are identical with steps S341 to S348 in FIG. 23 and hence not explained again.

In step S729, the service provider code, information providing company code, information code, and final reception ID are registered in the member information.

In step S730, the current location is saved in the storage unit 546 of the car navigation section 54 as the data reception location.

In step S731, the reception error flag is set on.

As mentioned above, the vehicle-mounted device 5 according to the seventh embodiment stores the current location when the communication with the roadside apparatus 2 is disconnected. When the communication with the roadside apparatus 2 is resumed, if the previously stored location is within a certain distance from the current location and the service provider code of the previous time agrees with the current one, the vehicle-mounted device 5 recognizes the currently received data as the one that succeeding the previously received data.

The roadside apparatus 2 is capable of deciding and distributing the transmission content based on the location information of the vehicle-mounted device 5. That enables the roadside apparatus 2 to quickly and simply resume the distribution.

the analysis abnormal end process and the reception abnormal end process executed by the vehicle-mounted device 5 according to the seventh embodiment are applicable not only to the third embodiment but also to the fourth and fifth embodiments.

While the present invention has been particularly described with respect to the embodiments according to the invention, it is to be understood that the invention is not limited to the above-mentioned embodiments, and alterations may be made within the spirit of the invention.

For example, the above-mentioned embodiments are adapted to have the roadside apparatus 2 decide and distribute the transmission content based on the uplink data transmitted from the vehicle-mounted device 5, but they may be adapted to have the roadside apparatus 2 decide and distribute the transmission content based on the data transmission history stored in the roadside apparatus 2 without being provided with the uplink data from the vehicle-mounted device 5.

Specifically, the roadside apparatus 2 may decide and distribute the transmission content based on the data transmission history stored in the storage unit 24 for each vehicle-mounted device 5 by identifying the vehicle-mounted device 5, which is a communication party, from the client information acquired from the vehicle-mounted device 5.

Accordingly, the roadside apparatus 2 can resume distribution of the content without knowing to what extent the data is saved by the vehicle-mounted device when the communication with the vehicle-mounted device 5 was interrupted.

The invention claimed is:

1. A road-vehicle communication system comprising a roadside apparatus for transmitting contents and a vehicle-mounted device for reproducing the contents transmitted from the roadside apparatus which are communicatively connected to each other, wherein it is judged whether or not the vehicle-mounted device is a member, and if it has been judged to be a member, the roadside apparatus receives uplink information including communication history information from the vehicle-mounted device having entered into a communication area and a series of contents is transmitted from the roadside apparatus to the vehicle-mounted device, the series of contents consisting of a plurality of contents based on the uplink information, wherein the roadside apparatus comprises:
a control unit configured to decide a content which the roadside apparatus starts transmitting to the vehicle-mounted device, which is a communication party, from among the series of contents and transmitting the other contents succeeding the decided transmission start content; and
a transmission history storage unit configured to store transmission history information, which indicates the content transmitted last among the series of contents for each vehicle-mounted device,
wherein the control unit identifies the vehicle-mounted device to be a communication party based on vehicle-mounted device information transmitted from the vehicle-mounted device upon starting the communication, and decides the content succeeding the content transmitted last to be the transmission start content.

2. The road-vehicle communication system according to claim 1, wherein
the transmission history storage unit stores the date of transmission together with the transmission history information and
the control unit of the roadside apparatus decides the first content of the series of contents to be the transmission start content, if the series of contents to be transmitted differ from the series of contents transmitted on the date of transmission.

3. The road-vehicle communication system according to claim 1, wherein
the vehicle-mounted device comprises
a current location storing unit configured to store the current location, and
the control unit of the roadside apparatus decides the first content of the series of contents to be the transmission start content, if a first current location stored in the current location storing unit when the communication was interrupted is not within a predetermined range from a second current location that has just been stored in the current location storing unit.

4. A road-vehicle communication system comprising a roadside apparatus for transmitting contents and a vehicle-mounted device for reproducing the contents transmitted from the roadside apparatus which are communicatively connected to each other, wherein it is judged whether or not the vehicle-mounted device is a member, and if it has been judged to be a member, the roadside apparatus receives uplink information including communication history information from the vehicle-mounted device having entered into a communication area and a series of contents is transmitted from the roadside apparatus to the vehicle-mounted device, the series of contents consisting of a plurality of contents based on the uplink information, wherein the roadside apparatus comprises:
a control unit configured to decide a content which the roadside apparatus starts transmitting to the vehicle-mounted device, which is a communication party, from among the series of contents and transmitting the other contents succeeding the decided transmission start content; and
the vehicle-mounted device comprises:
a reception history storage unit configured to store reception history information, which indicates the content received last among the series of contents transmitted from the roadside apparatus; and
a control unit configured to transmit the reception history information to the roadside apparatus upon starting the communication,
wherein the control unit of the roadside apparatus decides the content succeeding the content received last to be the transmission start content based on the reception history information transmitted from the vehicle-mounted device.

5. The road-vehicle communication system according to claim 4, wherein
the content includes a plurality of elements classified according to their details;
the reception history information includes the last received element information; and
the control unit of the roadside apparatus decides the last received content to be the transmission start content based on the reception history information transmitted from the vehicle-mounted device, and transmits the content from the element succeeding the element identified by the element information.

6. A road-vehicle communication system comprising a roadside apparatus for transmitting contents and a vehicle-mounted device for reproducing the contents transmitted from the roadside apparatus which are communicatively connected to each other, wherein it is judged whether or not the vehicle-mounted device is a member, and if it has been judged to be a member, the roadside apparatus receives uplink information including communication history information from the vehicle-mounted device having entered into a communication area and a series of contents is transmitted from the roadside apparatus to the vehicle-mounted device, the series of contents consisting of a plurality of contents based on the uplink information, wherein the roadside apparatus comprises:

a control unit configured to decide a content which the roadside apparatus starts transmitting to the vehicle-mounted device, which is a communication party, from among the series of contents and transmitting the other contents succeeding the decided transmission start content; and a transmission history storage unit configured to store transmission history information, which indicates the content transmitted last among the series of contents for each vehicle-mounted device, and the vehicle-mounted device comprises:

a reception history storage unit configured to store reception history information, which indicates the content received last among the series of contents transmitted from the roadside apparatus; and a control unit configured to transmit the reception history information to the roadside apparatus upon starting the communication, and wherein the control unit of the roadside apparatus decides the content succeeding the content received last to be the transmission start content based on the reception history information, if the reception history information transmitted from the vehicle-mounted device does not agree with the transmission history information for the vehicle-mounted device.

7. A non-transitory computer readable program for implementing a method for enabling resumption of transmission/reception in a road-vehicle communication system comprising a roadside apparatus for transmitting contents and a vehicle-mounted device for reproducing the contents transmitted from the roadside apparatus which are communicatively connected to each other, wherein it is judged whether or not the vehicle-mounted device is a member, and if it has been judged to be a member, the roadside apparatus receives uplink information including communication history information from the vehicle-mounted device having entered into a communication area and a series of contents is transmitted from the roadside apparatus to the vehicle-mounted device, the series of contents consisting of a plurality of contents based on the uplink information, if the content is stored in a storage medium of the roadside apparatus and the transmission/reception of the content between the roadside apparatus and the vehicle-mounted device is interrupted, wherein, in the method, the transmission/reception subsequent to the interrupted transmission/reception is resumed, and wherein the program is executed on a processor of the roadside apparatus to cause the processor to perform the steps of:

deciding a content which the roadside apparatus starts transmitting to the vehicle-mounted device, which is a communication party, from among the series of contents and transmitting the other contents succeeding the decided transmission start content; and storing transmission history information, which indicates the content transmitted last among the series of contents for each vehicle-mounted device, wherein a control unit of the roadside apparatus identifies the vehicle-mounted device to be a communication party based on vehicle-mounted device information transmitted from the vehicle-mounted device upon starting the communication, and decides the content succeeding the content transmitted last to be the transmission start content based on the transmission history information for the identified vehicle-mounted device.

8. A method for enabling resumption of transmission/reception in a road-vehicle communication system comprising a roadside apparatus for transmitting contents and a vehicle-mounted device for reproducing the contents transmitted from the roadside apparatus which are communicatively connected to each other, wherein it is judged whether or not the vehicle-mounted device is a member, and if it has been judged to be a member, the roadside apparatus receives uplink information including communication history information from the vehicle-mounted device having entered into a communication area and a series of contents is transmitted from the roadside apparatus to the vehicle-mounted device, the series of contents consisting of a plurality of contents based on the uplink information, if the transmission/reception of the content between the roadside apparatus and the vehicle-mounted device is interrupted, wherein the transmission/reception subsequent to the interrupted transmission/reception is resumed, the method comprising the steps of:

deciding a content which the roadside apparatus starts transmitting to the vehicle-mounted device, which is a communication party, from among the series of contents and transmitting the other contents succeeding the decided transmission start content; and storing transmission history information, which indicates the content transmitted last among the series of contents for each vehicle-mounted device, wherein a control unit of the roadside apparatus identifies the vehicle-mounted device to be a communication party based on vehicle-mounted device information transmitted from the vehicle-mounted device upon starting the communication, and decides the content succeeding the content transmitted last to be the transmission start content based on the transmission history information for the identified vehicle-mounted device.

9. A method for enabling resumption of transmission/reception in a road-vehicle communication system comprising a roadside apparatus for transmitting contents and a vehicle-mounted device for reproducing the contents transmitted from the roadside apparatus which are communicatively connected to each other, wherein it is judged whether or not the vehicle-mounted device is a member, and if it has been judged to be a member, the roadside apparatus receives uplink information including communication history information from the vehicle-mounted device having entered into a communication area and a series of contents is transmitted from the roadside apparatus to the vehicle-mounted device, the series of contents consisting of a plurality of contents based on the uplink information, if the transmission/reception of the content between the roadside apparatus and the vehicle-mounted device is interrupted, wherein the transmission/reception subsequent to the interrupted transmission/reception is resumed, the method comprising the steps of:

deciding a content which the roadside apparatus starts transmitting to the vehicle-mounted device, which is a communication party, from among the series of contents and transmitting the other contents succeeding the decided transmission start content at a control unit of the roadside apparatus; and storing reception history information, which indicates the content received last among the series of contents transmitted from the roadside apparatus, into a reception history storage unit of the vehicle-mounted device, wherein a control unit of the vehicle-mounted device transmits the reception history information to the roadside apparatus upon starting the communication, and the control unit of the roadside apparatus decides the content succeeding the content received last to be the transmission start content based on the reception history information transmitted from the vehicle-mounted device.

10. A method for enabling resumption of transmission/reception in a road-vehicle communication system comprising a roadside apparatus for transmitting contents and a vehicle-mounted device for reproducing the contents transmitted from the roadside apparatus which are communicatively connected to each other, wherein it is judged whether or not the vehicle-mounted device is a member, and if it has been judged to be a member, the roadside apparatus receives uplink information including communication history information from the vehicle-mounted device having entered into a communication area and a series of contents is transmitted from the roadside apparatus to the vehicle-mounted device, the series of contents consisting of a plurality of contents based on the uplink information, if the transmission/reception of the content between the roadside apparatus and the vehicle-mounted device is interrupted, wherein the transmission/reception subsequent to the interrupted transmission/reception is resumed, the method comprising the steps of:

deciding a content which the roadside apparatus starts transmitting to the vehicle-mounted device, which is a communication party, from among the series of contents and transmitting the other contents succeeding the decided transmission start content at a control unit of the roadside apparatus;

storing transmission history information, which indicates the content transmitted last among the series of contents for each vehicle-mounted device, into a transmission history storage unit of the roadside apparatus, and storing reception history information, which indicates the content received last among the series of contents transmitted from the roadside apparatus, into a reception history storage unit of the vehicle-mounted device, wherein a control unit of the vehicle-mounted device transmits the reception history information to the roadside apparatus upon starting the communication, and the control unit of the roadside apparatus decides the content succeeding the content received last to be the transmission start content based on the reception history information, if the reception history information transmitted from the vehicle-mounted device does not agree with the transmission history information for the vehicle-mounted device.

* * * * *